(12) United States Patent
Steinich

(10) Patent No.: US 6,430,836 B1
(45) Date of Patent: Aug. 13, 2002

(54) PULL ELEMENT TRAVEL SENSOR

(75) Inventor: Klaus-Manfred Steinich, Poering (DE)

(73) Assignee: ASM Automation Sensorik Messtechnic GmbH, Unterhaching (DE)

(*) Notice: Subject to any disclaimer, the term of this patent is extended or adjusted under 35 U.S.C. 154(b) by 0 days.

(21) Appl. No.: 09/468,925

(22) Filed: Dec. 22, 1999

(30) Foreign Application Priority Data

Dec. 22, 1999 (DE) .......................... 198 59 474

(51) Int. Cl.[7] .............................. B65H 61/00; G01B 7/02
(52) U.S. Cl. .......................................... 33/733; 33/1 PT
(58) Field of Search ................... 22/733, 762, 763, 22/1 PT; 242/174, 470, 476.7, 478.1, 534

(56) References Cited

U.S. PATENT DOCUMENTS

| 4,205,453 A | * | 6/1980 | Steele | 33/1 PT |
| 5,761,822 A | * | 6/1998 | Steinich | 33/762 |
| 6,269,547 B1 | * | 8/2001 | Chuang | 33/733 |

FOREIGN PATENT DOCUMENTS

| DE | 2316947 | 12/1973 |
| DE | 8801109 | 7/1988 |
| DE | 3910873 C2 | 1/1991 |
| DE | 19520388 A1 | 12/1996 |

* cited by examiner

Primary Examiner—G. Bradley Bennett
(74) Attorney, Agent, or Firm—Crowell & Moring LLP

(57) ABSTRACT

A pull element travel sensor include a winding drum and a pull element which can be wound on to and unwound from the winding drum. The winding drum is biassed in the pull element winding-on direction. The length of the pull element which is pulled off the winding drum can be detected by a detecting unit. The pull element is wound on the winding drum in a spiral configuration in a plurality of layers in mutually superposed relationship in a single radial plane of the winding drum. A lifting apparatus for lifting a load has at least two lifting units and at least one travel sensor, each lifting unit having a winding drum with a pull element and a motor for driving the winding drum in the winding-on direction. At least one of the lifting units has a detecting unit for detecting the drawn-off length of the pull element from the winding drum, with all pull elements of the lifting units engaging the same load.

24 Claims, 19 Drawing Sheets

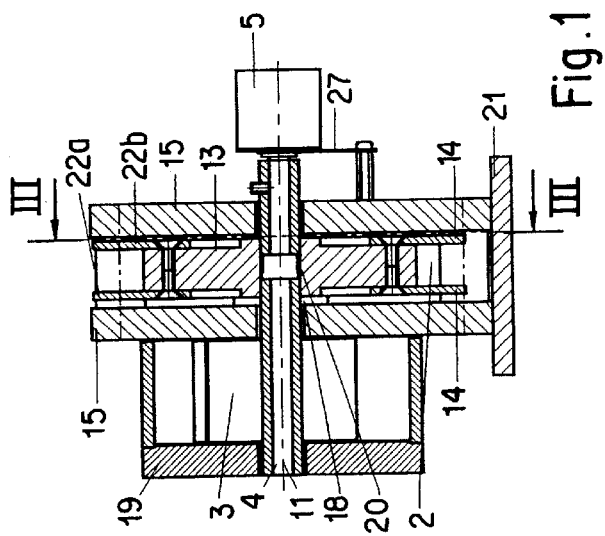
Fig. 1
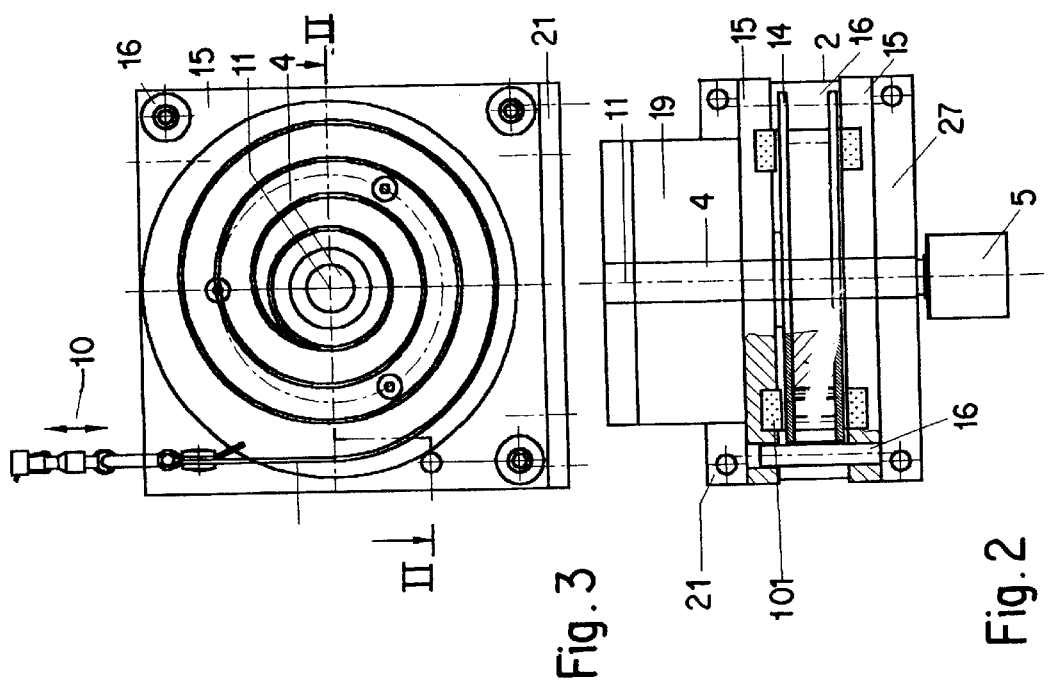
Fig. 3
Fig. 2

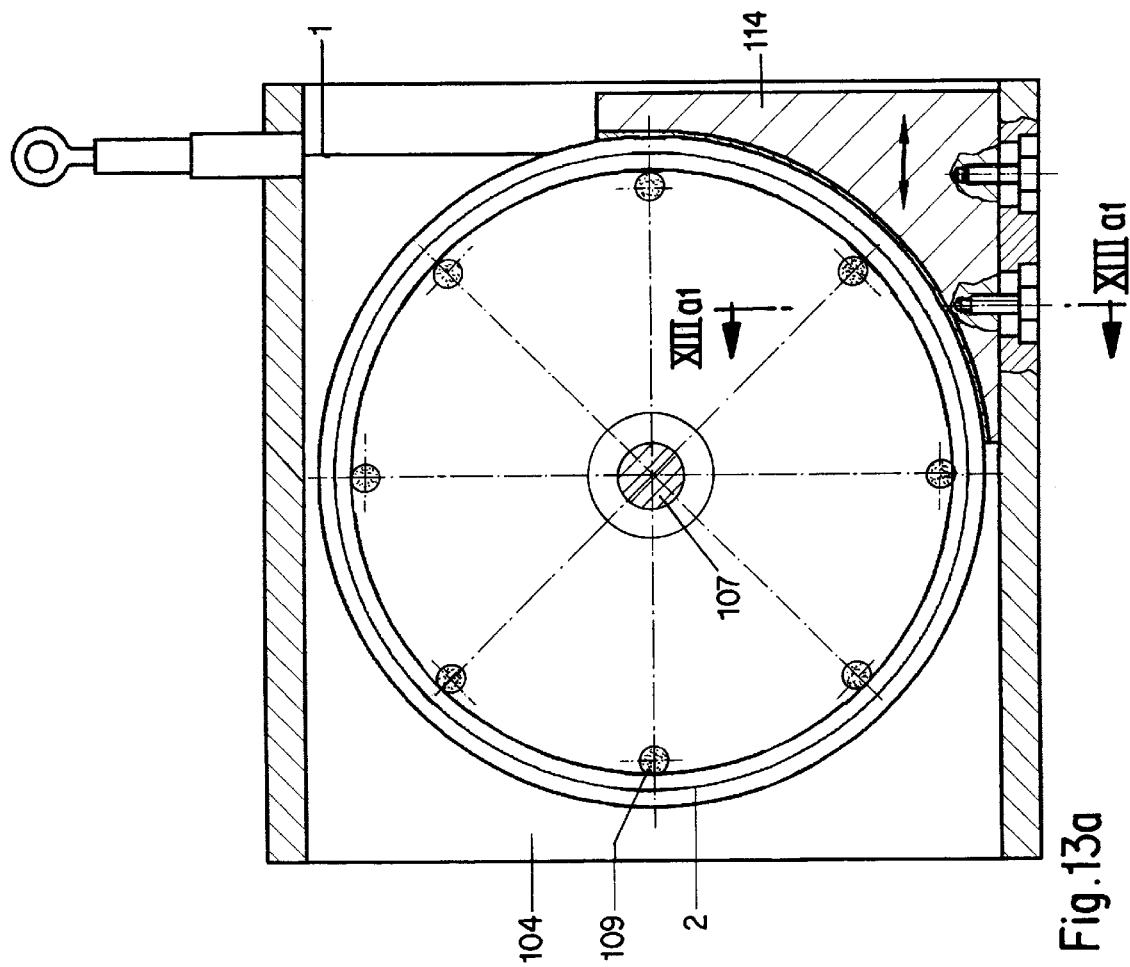
Fig. 13a
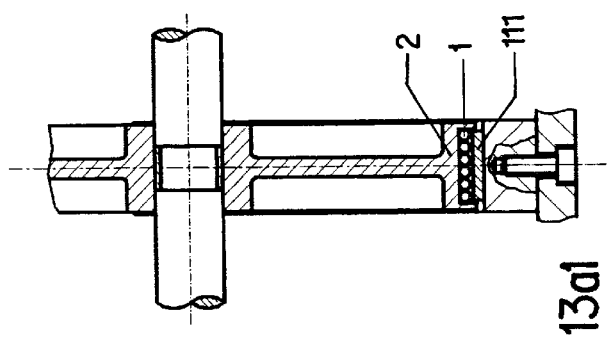
Fig. 13a1

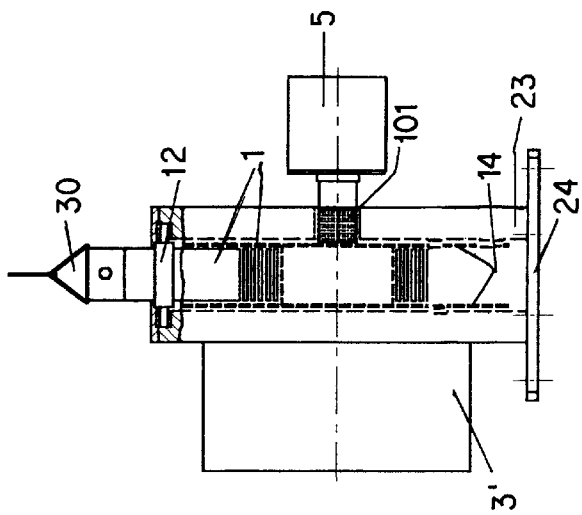
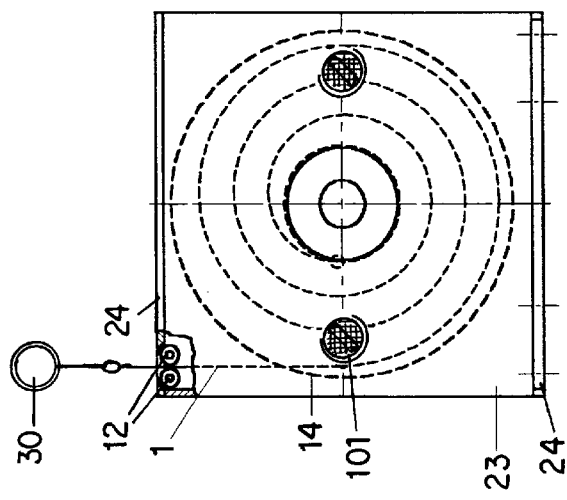
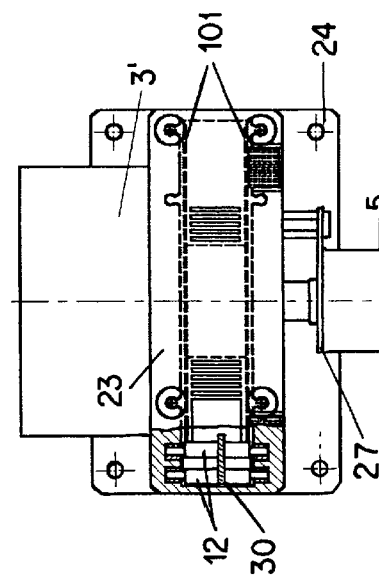
Fig. 14a
Fig. 14b
Fig. 14c

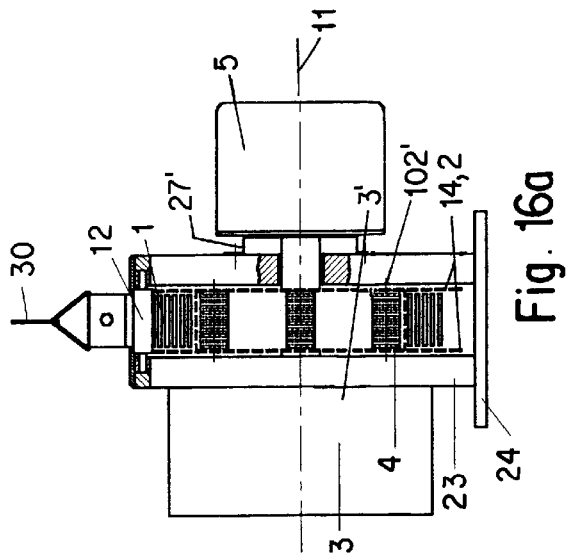
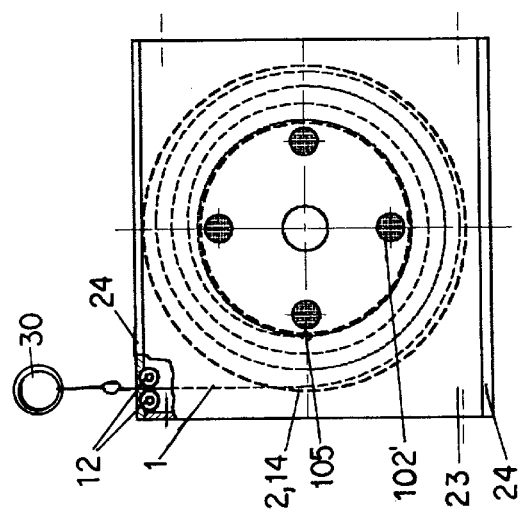
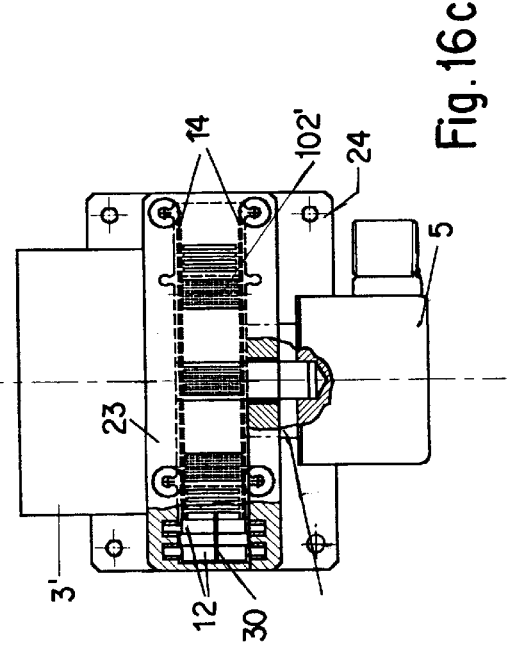

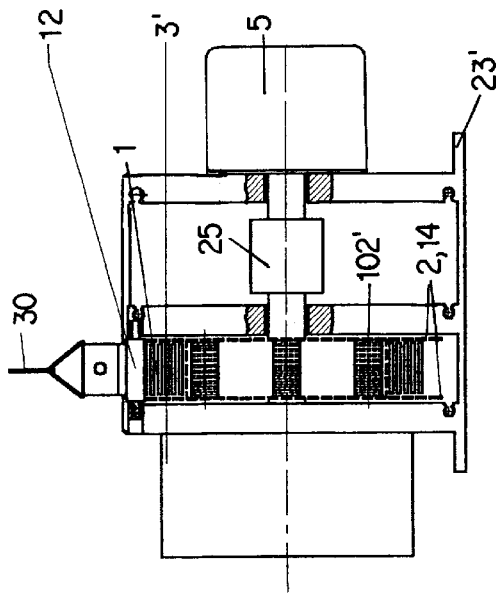
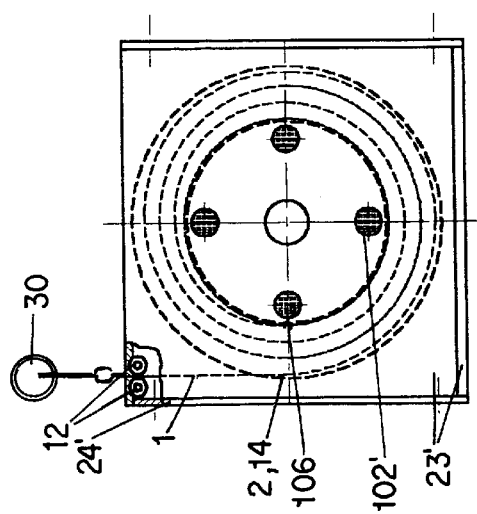
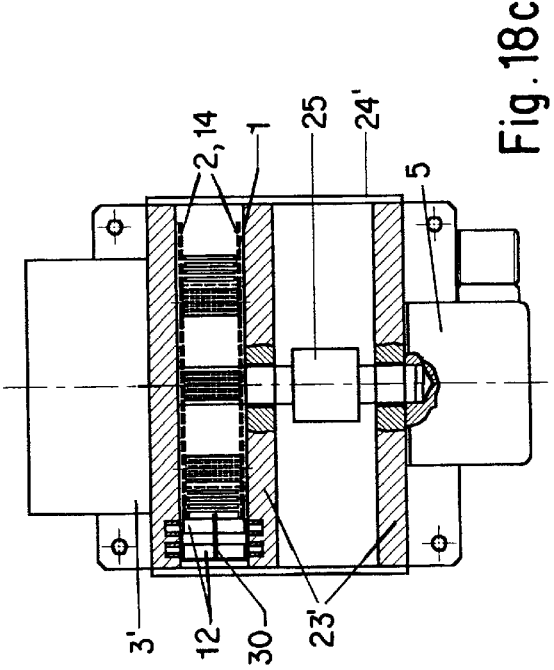

PULL ELEMENT TRAVEL SENSOR

BACKGROUND AND SUMMARY OF THE INVENTION

1. Field of the Invention

The invention concerns a pull element travel sensor and a lifting apparatus embodied with such elements.

2. Background of the Invention

Pull element travel sensors occur in many different configurations for example in order to determine the precise positioning of a given component which in particular can move over considerable travel distances, for example the cabin of an elevator. A typical pull element travel sensor of that kind has a tensile or pull element, for example a cable, which is wound on to a winding drum which is biassed in the winding-on direction. The free end of the pull element is connected to that component whose position is to be determined, for example as mentioned above an elevator cabin. A prestressing force for urging the winding drum in the winding-on direction is produced for example by way of a flat spiral spring which for example is arranged coaxially with respect to the winding drum and is non-rotatably connected thereto.

The winding drum is also typically connected to a detection unit for recording the revolutions or angular distances through which the winding drum passes in the winding-on or unwinding direction, and which in addition by way of a suitable electronic evaluation system determines the length of the pull element which has been drawn off the cable drum.

In order to simplify that operation of determining the drawn-off length of the pull element, for example a cable, the pull element is wound in only a single layer on the periphery of the winding drum, with the turns of the pull element on the winding drum being in axially juxtaposed relationship. As a result, one revolution of the winding drum will always correspond to exactly the same length of the pull element.

In order to ensure that the pull element is wound on to the drum in only a single layer and in order to prevent the pull element from jumping over on to the first layer to start a second layer there over when winding the pull element on to the winding drum, it is generally necessary to take suitable mechanical steps involving appropriate structure on the travel sensor to obviate that occurrence.

Instead of determining the rotary movement of the winding drum, it is also known for the length of the pull element, which has been drawn off the winding drum, to be determined directly, for example by arranging a counting device at the location at which the pull element issues from the housing of the winding drum, wherein the pull element has portions which are always of the same size and which are of different configurations, for example in the form of holes or perforations which are arranged uniformly in the longitudinal direction. Those different portions such as holes can be suitably counted by the counting device and converted in a suitable system into a measurement corresponding to the length of the pull element which has been drawn off the winding drum.

A disadvantage with that structure is that it is necessary to use a pull element of a special configuration whose differing portions must remain unchanged, even over a long period of time and even after a large number of operations of being wound on to and unwound from the winding drum. In the case of portions of different configurations on the pull element, such as for example holes, tooth arrangements and the like, they tend to be subjected to a high level of mechanical wear and thus enjoy only a limited service life.

In contrast thereto, determining the rotary movement of the winding drum by means of a rotary angle sensor which is operatively coupled to the rotary movement of the winding drum involves structure which is virtually wear-free and thus enjoys a very good overall service life.

SUMMARY OF THE INVENTION

An object of the present invention is to provide a pull element travel sensor of simplified mechanical structure, thereby to afford a pull element travel sensor of minimised axial length.

Another object of the present invention is to provide a pull element travel sensor capable of winding the pull element on the winding drum thereof without involving complicated mechanical components.

Still another object of the present invention is to provide a handling apparatus such as a lifting apparatus including a pull element travel sensor, capable of providing for precise vertical positioning of an object connected to the handling apparatus.

In accordance with the principles of the present invention, the foregoing and other objects are attained in a first aspect by a pull element travel sensor comprising a pull element winding drum and a biassing unit operatively connected thereto for biassing the winding drum in the direction of rotation thereof for winding the pull element on to the winding drum. A detection unit is operable to detect the length of the pull element which has been drawn off the winding drum. The pull element is wound on the winding drum in a single radial plane of the winding drum in a spiral configuration in a plurality of layers in mutually superposed relationship.

Further in accordance with the present invention, in a second aspect thereof, the foregoing and other objects are attained by a handling apparatus such as a lifting apparatus for lifting a load, comprising at least first and second lifting units and at least one travel sensor. Each lifting unit includes a pull element winding drum and a biassing unit operatively connected thereto for biassing the winding drum in the direction of rotation of the winding drum for winding the pull element on to the winding drum. A motor drives the winding drum at least in the winding-on direction. The lifting units are arranged with downwardly facing free ends of the pull elements. At least one of the lifting units is provided with a detection device for detecting the length of the pull element which has been drawn off the winding drum and all pull elements engage the same load.

In accordance with the principles of the present invention moreover in a third aspect the foregoing and other objects are attained by a pull element travel sensor comprising a winding drum for winding a band on an external winding surface of a winding cylinder portion of the winding drum, and a housing in which the winding drum is rotatably mounted. At least one braking magnet is arranged at a point non-rotatable with the winding drum in such a way that it acts brakingly against the direction of rotation in contactless magnetically on the winding drum at an eccentric region of action thereof, the winding drum at least in the region includes electrically conductive material.

Further in accordance with the principles of the invention in a fourth aspect the foregoing and other objects are attained by a pull element travel sensor comprising a winding drum for winding a band on to an external winding surface of a winding cylinder portion of the winding drum, and a housing in which the winding drum is rotatably mounted. At least one braking magnet arranged eccentrically on the winding drum is operable to brakingly act on the housing in the direction of rotation in contact-less mode magnetically, the housing, at least in the region in which the magnet acts thereon, has electrically conductive material.

Additionally in accordance with the invention the foregoing and other objects in a fifth aspect are attained by a pull element travel sensor comprising a winding drum for winding a band on the external winding surface of a winding cylinder portion of the winding drum, and a housing in which the winding drum is rotatably supported. At least one holding magnet is arranged on the winding drum radially within the winding surface of the winding cylinder portion of the winding drum and is operable to hold the band radially inwardly to the winding surface, the band having magnetisable material.

In accordance still with the principles of the invention in a sixth aspect the foregoing and other objects are attained by a pull element travel sensor comprising a winding drum for winding a band on to an external winding surface of a winding cylinder portion of the winding drum, and a housing in which the winding drum is rotatably mounted. A sliding band extends around at least a part of the external periphery of the winding surface of the winding drum, which is at least in part movable with the band. The sliding band in particular comprises textile material, more especially a friction band or a band of other slidable, non-abrasive material. The band is passed around the winding surface at a small spacing in relation thereto or in rubbing relationship at the outside periphery of the winding of the winding band on the winding drum. The travel sensor has a device for adjusting the spacing or the contact pressure of the sliding band against the turns of winding band on the winding drum.

As will be seen in greater detail from preferred embodiments of the invention as described hereinafter, the invention in its first aspect affords a mechanical structural simplification by virtue of the fact that the pull element is wound on to the winding drum in a spiral configuration in a single radial plane and not in axially juxtaposed turns. The disadvantage that this apparently entails in terms of evaluation of the length of the winding element which is drawn off or wound on to the winding drum, more specifically that with increasing winding of the pull element on the winding drum the peripheral length of a single winding on the winding drum becomes progressively greater, is eliminated by a non-mechanical electronic device.

In order to determine the precise length of the pull element which has been drawn off the winding drum, the arrangement involves the use of an electronic evaluation system which does not associate a pull element length which is always the same, with a given angle of rotary movement of the winding drum, but also takes account of the instantaneous number of turns on the winding drum at a given moment.

A particularly simple configuration lies in an evaluation circuit which is capable of learning, referred to as a learning evaluation circuit, such that, before the pull element travel sensor is brought into operation, a single time, a defined length of the pull element is drawn off the winding drum, for example the known complete length of the pull element, and the angular segments of the winding drum or the rotary angle sensor, which have been covered in that procedure, are recorded by the electronic evaluation system. All smaller and possibly even larger draw-off lengths of the pull element are suitably extrapolated or interpolated, for example, arithmetically.

In a preferred embodiment, it is also possible to take into consideration the jump in winding diameter which occurs when winding the pull element on the winding drum, at a respective given rotational position which corresponds to the point at which the inner end of the wound-on pull element is fixed to the winding drum.

If the winding drum biasing unit is formed by conventional flat spiral springs, and if the detection unit for detecting the drawn-off length of the pull element is in the form of known rotary angle sensors, then, except for the simplified housing structure in the greatly simplified region at which the pull element passes into the housing of the travel sensor, all previously known components and possibly even the housing itself can continue to be used. Modifications are thus required only in terms of the electronic evaluation system.

Another option is that the detection unit directly ascertains the relative movement of the pull element with respect to a stationary point, for example the housing, with the detection unit being fixed to the housing for example in the proximity of the location at which the pull element passes into the housing.

For that purpose, the pull element, in the longitudinal direction thereof, must have distinguishable portions arranged at a defined spacing and the resolution of which also determines the measurement accuracy thereof. As measurement sensors of that kind are intended to implement operations for determining position, which are precise to a tenth or even a hundredth of a millimeter, it is generally more complicated and expensive to provide for such portion-wise distinguishability with individual portions which are only a few tenths or even a few hundredths of a millimeter in length over the entire length of the pull element, than on the basis of a single revolution of a rotary angle sensor. Preferably, the portions of the pull element are not mechanically distinguishable but are adapted to be electrically distinguishable, for example by being differently magnetised in portion-wise manner or by being of a metallic and non-metallic nature in a portion-wise manner or by virtue of being adapted to afford different optical reflective properties by means of suitable treatment methods.

In the latter case, the basic material selected may not be a metal band which otherwise forms a mechanically preferred embodiment of the pull element. In principle the pull element used, instead of an otherwise conventional cable as is used when the situation involves winding a single layer on a winding drum, is preferably a wide band which is as thin as possible in comparison to its width, in order to permit the band to be tidily wound in a spiral configuration in a single radial plane, so that in each turn it is repeatedly possible to achieve precisely the same winding length in each new winding operation.

In principle the pull element must be stable in the longitudinal direction, that is to say as far as possible it is not to be stretchable, while in the thickness direction it is to be of a thickness which is as far as possible always the same, and therefore cannot be expanded and/or compressed.

In addition however in principle the following disadvantages may occur in practical operation.

By virtue of the spring biasing effect on the winding drum, if for example an excessively low level of resistance is applied to the pull element when it is being wound on to the winding drum, the winding drum can reach very high speeds of rotation. As a consequence, at the end of the winding-on movement, the free end of the pull element hits against the entry to the housing with a high level of inertia, which can result in damage.

For the same reason, the pull element can also rise up away from the winding surface of the winding drum, that is, a radial spacing is formed between the pull element and the peripheral winding surface of the winding drum, due to the pull element being thrown radially outwardly away from the winding drum as it is being wound thereonto, and in that situation, in a worst-case scenario, an irregular winding of the pull element on the winding drum may result.

In consideration of the foregoing problems, and in regard to the further aspects of the invention as outlined above, involving a retardation or braking magnet on the housing or the winding drum, as will further become apparent from the description hereinafter of preferred embodiments of the invention, it is possible to limit the speed of rotary movement of the winding drum by the use of the contact-less magnetic braking assembly. The components involved in that structure are to comprise an electrically conductive material.

The braking moment can be generated between an eccentrically disposed region of the drum, preferably a region which is in the proximity of the external periphery thereof, and a stationary point which is thus non-rotatable with respect to the drum, for example a part of the housing of the drum.

As the pull element is wound on to the winding drum on the radially outwardly disposed peripheral surface thereof, the magnets are preferably oriented in a longitudinal direction, that is to say parallel to the axis of rotation of the winding drum, between two components which are adjacent to each other in that axial direction.

In such an arrangement, by virtue of the rotary movement of the winding drum, and irrespective of the spacing of the retardation or braking magnet relative to the component to be influenced thereby, an eddy current is first produced in the component which carries the retardation or braking magnet. The consequence of that eddy current is a magnetic field which is closed by way of the portion which is not in the magnetic field, thereby producing a braking moment.

Besides the strength of the magnet used, the braking action is determined to a very great extent by the spacing between the magnet and the component to be influenced thereby, and it is for that reason that this spacing should preferably be adjustable.

The respective component, which is to be subjected to the influence of the braking magnet, must include electrically conductive material, for example aluminum. When the magnet or magnets are arranged on the drum, that increases the inertial mass thereof, and that therefore affords the aspect of the invention which entails arranging the braking magnet or magnets at a stationary point, for example, on the housing. That would also remove the compulsion for the provision of at least a pair of braking magnets on the winding drum, which would give rise to a winding drum unbalance, and that arrangement also makes available more space for example for fitting a magnet holder for adjustability of the air gap.

A consideration which is in favour of arranging the magnet or magnets on the drum however is the possibility that the magnet or magnets can be used at the same time and thus as a functionally combined unit as a holding magnet or magnets.

In this respect, in this specification the term holding magnet is used to denote a magnet which is intended to prevent the pull element or band from climbing up or rising away from the winding surface formed by the external surface of the winding cylinder portion of the drum, insofar as the material of the pull element, which can be in the form of a band and which for this purpose is necessarily magnetisable, is drawn radially inwardly by magnetic force towards that winding surface. Accordingly holding magnets of that kind have to be disposed radially within the winding surface on the drum, and preferably therefore fixed on the inside of the winding cylinder which consists of a thin material, preferably in turn distributed over the periphery of the drum. In this case also, the recommendation is for the axis of magnetisation of the magnet or magnets to be oriented parallel to the axis of rotation of the drum, that is to say, it is recommended to provide a bar magnet, in particular a permanent magnet, which extends in the longitudinal direction of the drum.

In both cases the magnetic force can be increased by the provision of pole shoes or pole pieces, that is to say involving close contact of iron materials against at least one outside of the magnet, in order thereby to reduce the level of magnetic losses. Preferably, the arrangement does not involve any covering by a pole piece in that direction in which the field lines are required to pass into or out of the magnet freely. Therefore, primarily cup-shaped pole pieces are preferred, which in the case of the retardation or braking magnet are directed with their open side towards the component to be influenced by the magnetic effect and which, in the case of the holding magnet, are directed with their open side radially outwardly towards the pull element or band.

It is also possible to achieve an increase in the level of retardation or braking force by using rare earth magnets, that is to say magnets with components of samarium, cobalt, neodymium and/or boron. In particular rare earth magnets of that kind can be used to produce disk-shaped magnets whose magnetisation axis extends in parallel relationship to the thickness of the disk through the disk and/or which in that case can be magnetised differently in a sector-like configuration.

These type of disk-shaped magnets can be disposed in the constricted conditions in terms of space of pull element travel sensors, more easily than elongate bar magnets.

In particular such disk-shaped magnets can be accommodated in the end of screwthreaded pins or bolts as magnet holders which, in the component carrying them, can be moved by screwing closer towards or further away from the component to be influenced by the magnetic effect, in order thereby to provide for adjustability of the desired effect.

As an alternative and/or a supplement to the holding magnet or magnets, as indicated above, it is further possible in accordance with the invention to pass around the outside periphery of the movable winding drum a sliding band or belt, in particular a textile band or belt or a felt band or belt or more particularly a belt of plastic material such as PE, POM or PTFE, which when the pull element is wound correctly on the winding drum does not involve any contact with the wound turns of the pull element or bears against them without applying any force thereto, but which in contrast applies a force to the pull element if it climbs up on to a previous turn already formed on the winding drum.

Further objects, features and advantages of the invention will be apparent from the description hereinafter of preferred embodiments of the invention.

BRIEF DESCRIPTION OF THE DRAWINGS

FIG. 1 is a view of a first embodiment of a pull element travel sensor according to the invention in section through the axis of rotation thereof, FIG. 2 is a view on to the FIG. 1 travel sensor transversely with respect to the axis of rotation thereof, FIG. 3 is a view on the FIG. 1 travel sensor looking in the direction of the axis of rotation thereof, FIG. 13a shows another embodiment of the pull element travel sensor, as a front view and in section taken along line BB in the front view indicated at AA, FIGS. 14a through 14c show a front view, a side view and a plan view respectively of another embodiment having braking magnets, FIGS. 16a through 16c show views corresponding to FIGS. 14a through 14c with braking magnets and holding magnets, FIGS. 18a through 18c shows yet a further embodiment with combination magnets and a coupling means.

DESCRIPTION OF PREFERRED EMBODIMENTS

Figure 4:
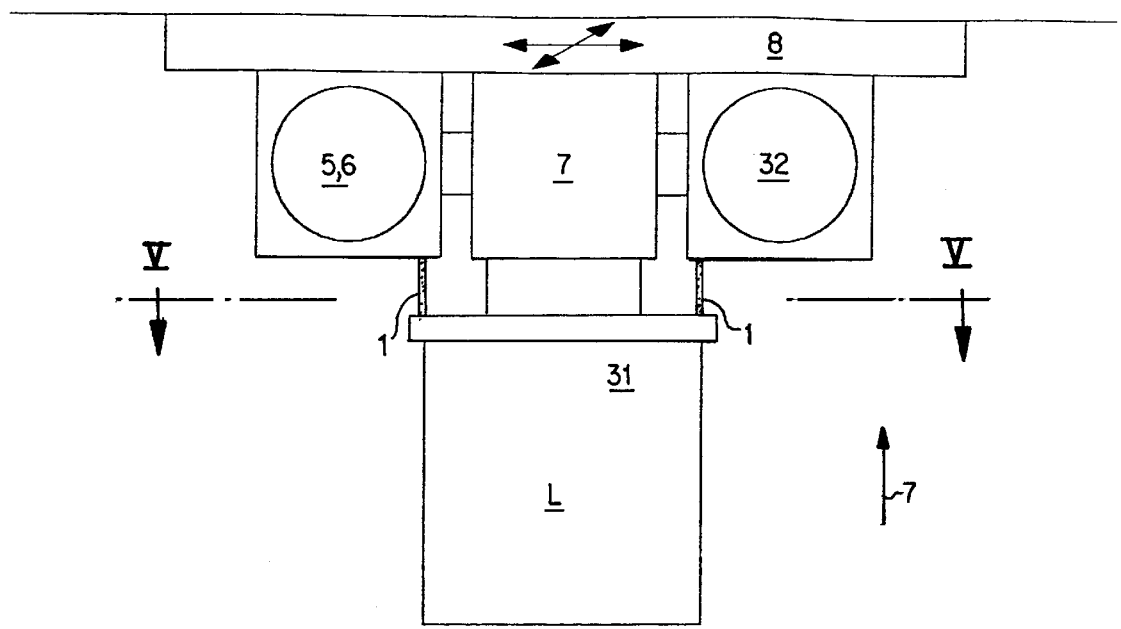
FIG. 4 is a side view of a lifting apparatus.

Referring firstly to FIGS. 1 through 3, it will be noted at this point that, while FIGS. 1 and 2 show the pull element travel sensor according to the invention, for reasons of clarity of the drawing, without the tensile or pull element which will generally be in the form of a band or belt, the band or belt forming the pull element is in fact shown in FIG. 3 and indicated therein by reference numeral 1, including spiral winding thereof on a measuring or winding drum generally identified by reference numeral 2 in FIGS. 1 through 3. The cross-sectional view in FIG. 1 shows the coaxial arrangement of the winding drum 2, a rotary angle sensor 5 for detecting the rotary movement or the angular positioning of the winding drum 2, and a flat spiral spring 3 operable to urge the winding drum 2 in the direction of winding the pull element or band 1 on to same.

As can be seen from FIG. 1, the winding drum 2 comprises a drum core 13 which is fixed non-rotatably by means of a tolerance ring 20 on the outside periphery of a hollow shaft 4, and annular end plate portions or disks 14 which are screwed on to the end faces of the drum core 13 and which project radially outwardly beyond the outside periphery of the drum core 13, thereby forming the necessary side portions 22a, 22b which prevent axial slipping of the pull element or band 1 which is to be wound on to the drum 2 between them.

The winding drum 2 is rotatably accommodated in a housing which comprises two housing plates indicated at 15 which are arranged to the left and to the right beside respective sides of the winding drum 2 and which are connected together in the axial direction by way of housing pins or bolts indicated at 16 in FIG. 3, outside the region of the winding drum 2.

As FIG. 3 shows, the housing plates 15 are preferably of a rectangular configuration and a respective such housing pin or bolt 16 is disposed in each of the housing corners which extend beyond the winding drum 2.

The shaft 4 is supported in the housing plate portions 15, extending through suitable bores there through. The winding drum 2 is non-rotatably fixed on the shaft 4 by suitable fixing means such as a tolerance ring 20 as illustrated.

Arranged at the point of entry of the band 1 into the housing, between the housing plate portions 15, are two spaced-apart parallel guide rollers 12 (shown and labeled in FIGS. 14–18a–c) which are so positioned that they allow the band 1 to slide through between them and ensure fold-free guidance thereof in 1 to slide through between them and ensure fold-free guidance thereof in tangential relationship with the winding drum 2. The housing also has a laterally outwardly projecting base plate indicated at 21.

In FIG. 1 the shaft 4 projects on the left-hand side beyond the left-hand housing plate portion 15. A flat spiral spring 3 which is also wound in a spiral configuration in one plane is fixed on the shaft 4 at the outwardly projecting portion, by means of its inner end, while the outer end of the spring is secured to the mounting casing 19 which encloses the spring 3 and which is of a generally cup-shaped configuration and which is fitted with its open side on the outward side of the adjoining housing plate portion 15 and is fixed with respect thereto.

The shaft is supported with its left-hand free end in the end plate portion of the mounting casing 19.

The shaft 4 also extends somewhat beyond the right-hand housing plate portion 15 where it is non-rotatably connected to a rotatable shaft or trunnion portion of the angle sensor 5 for recording the rotary movement of the shaft 4. In order to prevent the angle sensor 5 from also being entrained in a rotary movement, the angle sensor 5 is fixed non-rotatably with respect to the right-hand housing plate portion 15 by way of a torque support, using a sheet metal fork 27 which extends radially outwardly from the angle sensor 5 and which is fixed at its free end to the housing plate portion 15 by means of a torque support bolt 28.

FIG. 3 in this respect shows a crucial feature, more specifically that the band 1 forming the pull element of the travel sensor is wound in a spiral configuration in a plurality of layers in mutually superposed relationship in a single radial plane which is perpendicular to the axis of rotation 11, at the center of the shaft 4.

In this respect, the band 1 is of a width 16, as shown in FIG. 2, which is only slightly less than the internal spacing between the side portions 22a, 22b forming radially outwardly projecting flanges on the winding drum 4.

If, in addition, the band 1 used is in the form of a band which, in the plane of the band in the unwound condition, cannot be deflected or can be deflected only to a very slight degree transversely with respect to the longitudinal direction of the band, as is the case, for example, with a metal band, then the lateral stability of the band can also serve to prevent lateral displacement of the component which is fixed to the free end of the band.

This may be necessary, for example, when a plurality of the above-described travel sensors, each additionally equipped with a driving motor, are combined to form a lifting apparatus, as will now be described with reference to FIGS. 4 and 5.

In principle in many situations of use of a handling apparatus, such as a lifting apparatus, there is the problem that, for storage systems and so forth, objects and articles have to be stacked in mutually superposed relationship and/or removed again from the stacks, operations which are generally implemented in the interior of a building. The grater the height of the stacks is to be in comparison with the free internal height of the building, the correspondingly more restricted is the remaining vertical clearance for installation of the lifting apparatus. Lifting apparatuses are typically in the form of telescopic arms, hinged arms and the like, which can be suitably controlled to very precise positions for gripping or putting down a load, by means of electronic control systems. In comparison with the height of stack which can be managed however, lifting apparatuses of that kind generally require an amount of clearance with respect to the underneath of the ceiling of the building, which is still considerable in relation to the maximum height of stack.

Travelling cranes or overhead cranes or the like in which the lifting cable is wound on in such a way as not to take up a great deal of space in that condition manage with a smaller amount of overhead clearance or head clearance. By virtue of lateral deflection of such a crane cable however it is generally not possible to achieve accurate positionability, in particular without human intervention, relative to the load which is to be picked up.

For that reason, instead of using a crane cable, it is also possible for a load which is to be picked up or put down to be engaged by two spaced-apart bands or even more, such as, for example, four bands or belts which are arranged at the corners of a quadrangle and which extend in a vertical direction. The bands can be wound onto suitable drums, on the ceiling of the building.

This entails the advantage of requiring only a small amount of vertical space under the ceiling of the building, and it avoids the disadvantage of lateral deflection and poor positionability as this assembly involves the adoption of bands which are not deformable in their plane transversely with respect to their longitudinal extent and which therefore cannot suffer from adverse deflection. Particularly when four such bands are arranged each at a right angle to each other, it is possible to provide that a load is accurately engaged and precisely set down, even when operating over long lifting and lowering heights.

It will be appreciated that it is also necessary in this case to provide for detecting the position of the load in a vertical direction, preferably for example by determining the spacing of the free ends of the respective bands from the respective drums on to and off which they are wound. Optical systems can be used for that purpose, or alternatively it is possible to use the prior form of pull element travel sensors in which the travel sensors in the form of bands are wound on the respective winding drum in a winding formed by a single layer of turns thereon, to constitute an ancillary device for co-operation with the lifting apparatus operating with bands.

In accordance with the invention the two units involved, namely the lifting apparatus and a pull element travel sensor in accordance with the invention as described hereinbefore, can now be joined as a single structural configuration in a functional combination.

For that purpose, and looking now at FIG. 4, the bands of a plurality of lifting apparatuses jointly engage, either directly a load as indicated at L or a fixing or suspension member as indicated at 31 which serves for fixing to the load L. These components are also visible in the plan view of FIG. 5.

Figure 5:
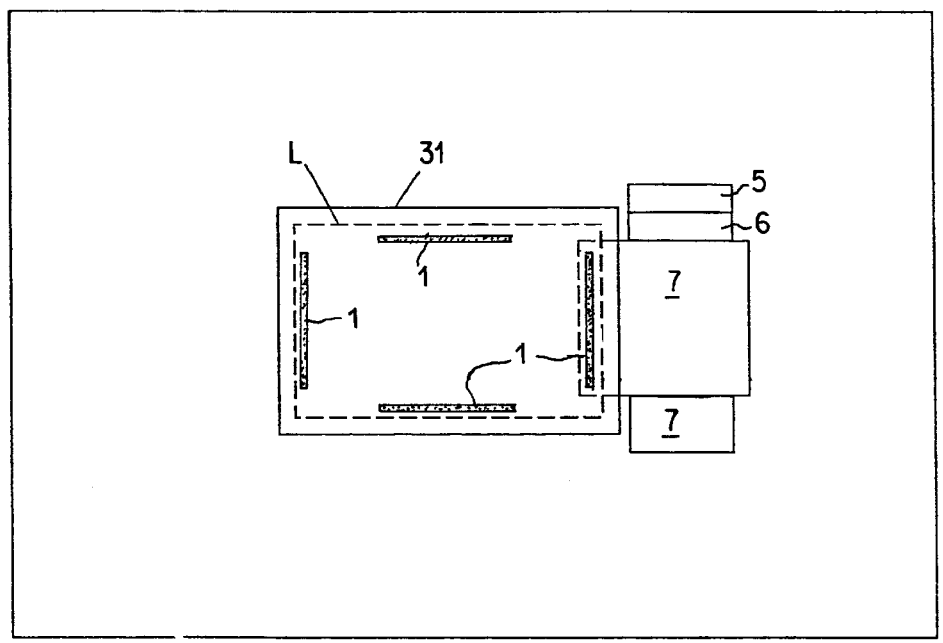
FIG. 5 is a view in horizontal section through the lifting apparatus of FIG. 4.

In the structure shown in FIGS. 4 and 5 four lifting apparatuses 7 with their respective pull element in the form of a band 1 so engage the fixing member or adaptor 31 that, as viewed in the direction of movement of the bands 1, the four band cross-sections are in right-angled relationship with each other, as can clearly be seen from FIG. 5. In regard to at least two mutually oppositely disposed ones of the lifting apparatuses or lifting units, the winding drums 2 thereof must be drivable by motor means at least in the winding-on direction in order to be able to lift the load L. That is not necessarily the case with the other two lifting apparatuses 7, but making all the lifting apparatuses drivable by motor means may be desirable as this can only help to stabilise the load L.

Each of the lifting units must also be provided with a biassing device for biassing the winding drum 2 in the winding-on direction. This however may at the same time also be the motor drive which can not only be stopped in any winding-on position but which in that position also self-lockingly fixes the winding drum 2 so as to make it possible to avoid the winding on the winding drum 2 from coming loose, for example when a load is resting on the ground and the tension in the respective pull elements or bands 1, caused by the weight of the load, is thus relieved or at least reduced.

The motor drives of all motor-driven lifting apparatuses must be synchronised with each other.

Moreover, as can best be seen from FIG. 5, in regard to at least one of the winding units or apparatuses 7 but preferably in regard to each thereof, the winding drum 2 is provided with a rotary angle sensor as indicated at 5, for recording the wound-on or unwound angular segments of the winding drum 2 and thus to ascertain the length of the band 1 which has been unwound from or wound on to the respective winding drum, on the basis of suitable electronic evaluation by device 6. That means that the instantaneous distance of the load L or the adaptor member 31 from the respective lifting apparatus or unit 7 is known, and the motors indicated at 32 in FIG. 4 can be suitably controlled for setting down or picking up the load L in an accurate position.

For use in a storage facility for stacking loads one upon the other and removing loads from a stack and in towers in juxtaposed relationship, the four co-operating lifting apparatuses or units 7 are shown as being mounted to the underside of a sliding carriage 8 which is displaceable in the horizontal longitudinal and transverse directions so that it is possible to move with the load L to any desired point in the three directions in space.

Figure 6:
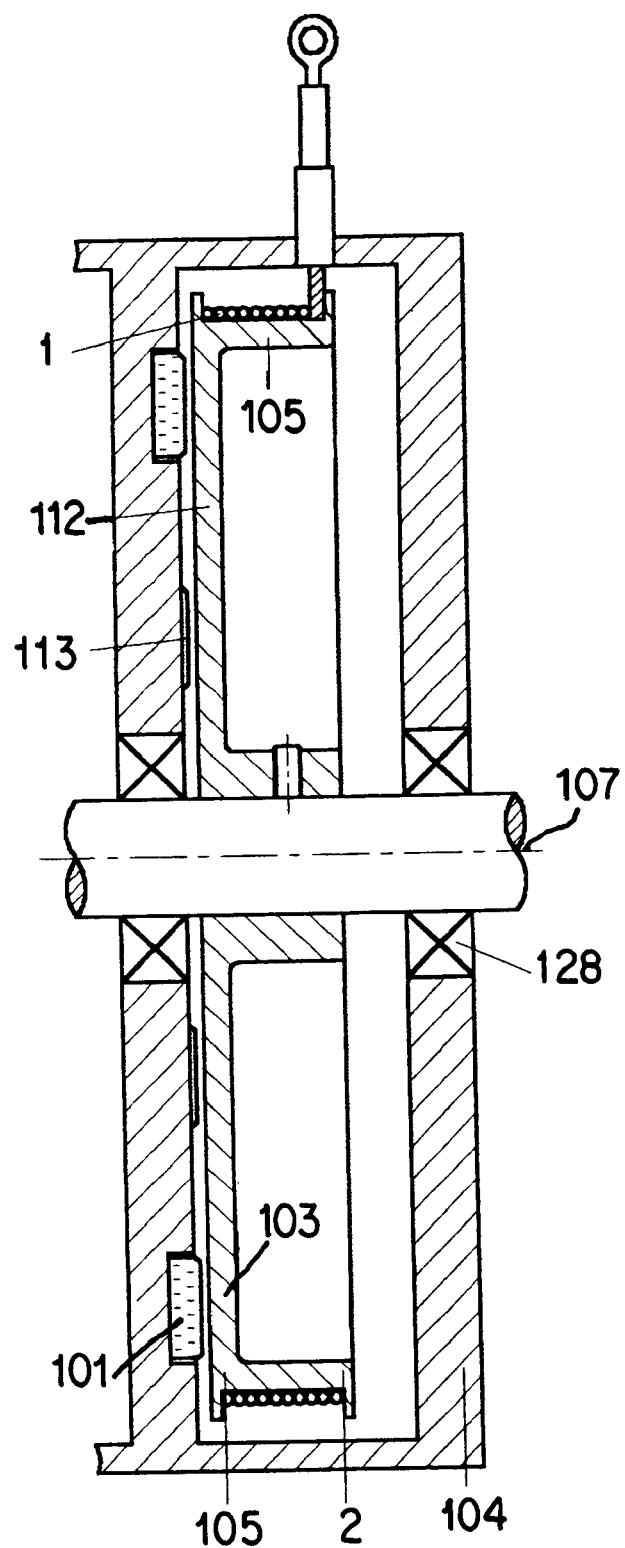
FIG. 6 is a view in section showing retardation or braking magnets disposed in the housing of the travel sensor.
Figure 7:
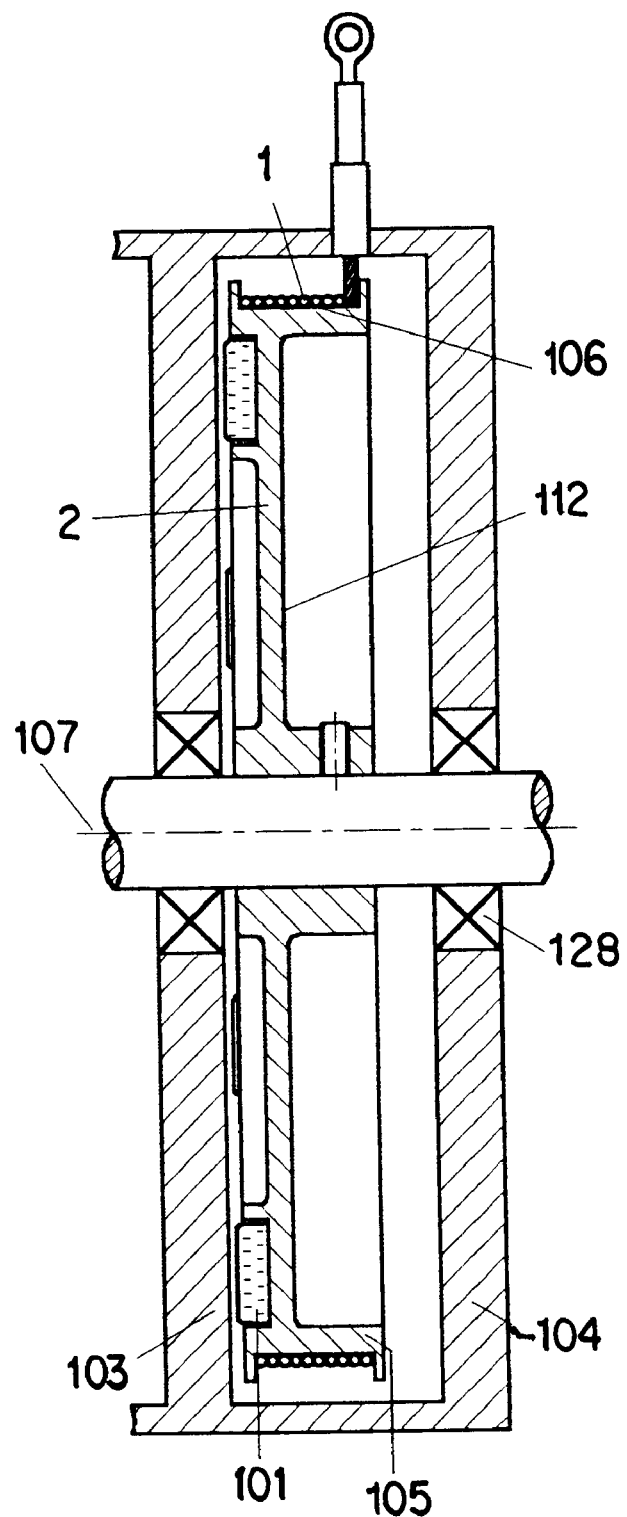
FIG. 7 is a view in section showing retardation or braking magnets in the winding drum of the travel sensor.

Reference will now be made generally to FIGS. 6 and 7 which each show a respective embodiment of a travel sensor according to the invention, comprising a rotatable winding drum 2 which is suitably fixed on a rotatable shaft and which can thus rotate about an axis of rotation as indicated at 107 in FIGS. 6 and 7. For that purpose the rotatable shaft is supported by means of bearings 128 in a housing which in the illustrated structure comprises a generally box-shaped, preferably closed profile member 26.

The winding drum 2 comprises a winding cylinder 105 with an external peripheral winding surface 106 which thus forms the external periphery of the winding cylinder 105. The winding cylinder 105 has radially outwardly facing abutments at each of the two ends thereof for limiting the arrangement of a pull element in the form of a band 1 which is to be wound on the winding surface 106. The winding cylinder 105 joins to the hub region of the winding drum 5 in a single step by way of individual spokes or a spoke disk as indicated at 112 for example in FIG. 6.

While in FIG. 6 the spokes or the disk 112 coincide with and are in alignment with the one axial end of the winding cylinder 105 and thus the winding drum 2 and are thus disposed closely adjacent to the wall of the housing member 26 which is at the left in FIG. 6, in the structure shown in FIG. 7 the spoke disk 112 is set back somewhat from the outer axial edge of the winding surface 106 of the winding cylinder 105.

In a corresponding manner, in FIG. 6 the at least one retardation or braking magnet which is indicated at 101 is arranged in that wall of the housing member 26, which is disposed at a small axial spacing in opposite relationship to the drum spoke disk 112, so that there is only a small air gap between the braking magnet or magnets 101 and the disk 112.

Figure 8:
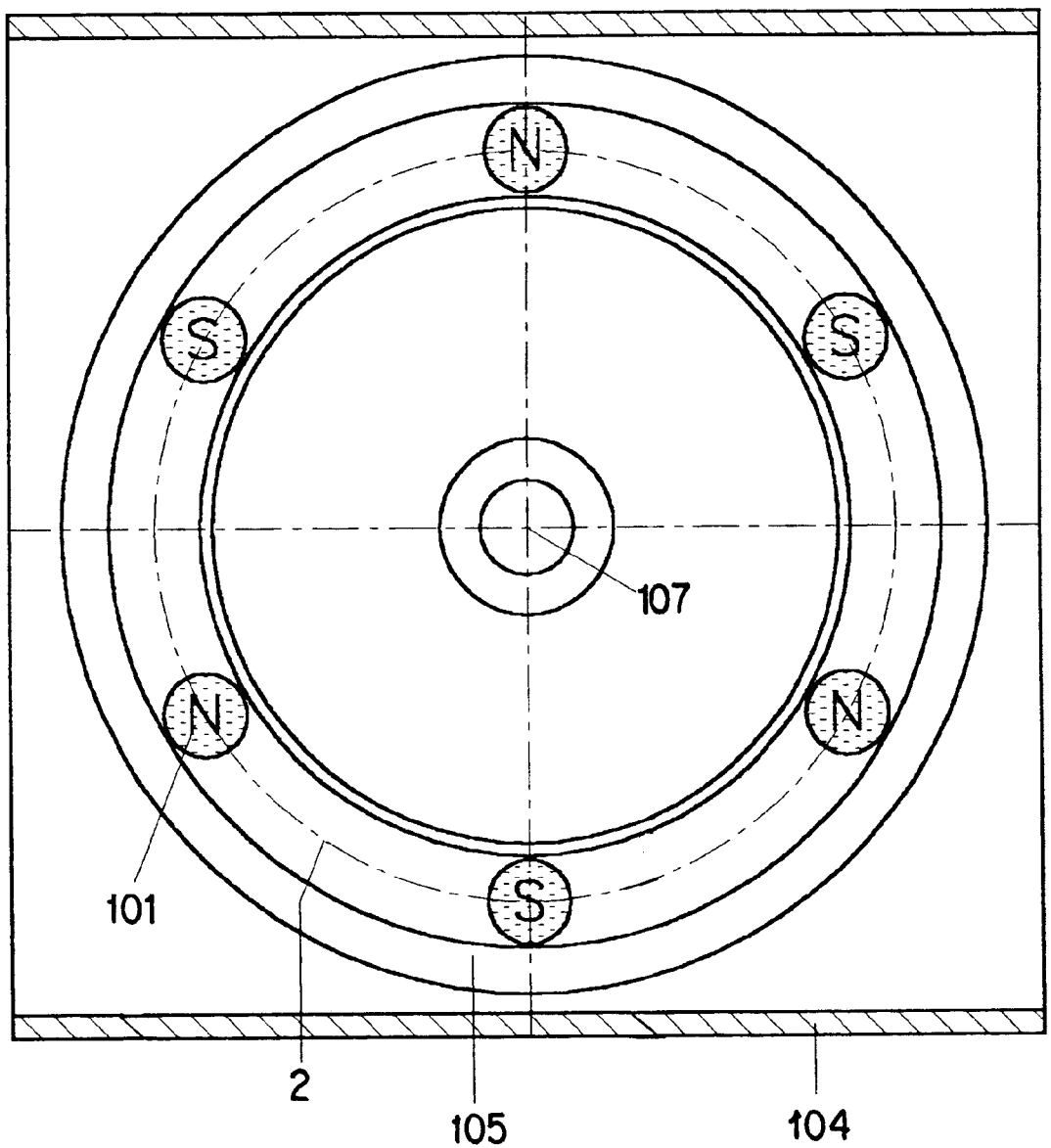
FIG. 8 is a front view of the winding drum of FIG. 7.

The braking magnet or magnets 101 are arranged in the radially outward region of the winding drum 2, adjacent to or in the region of the winding cylinder 105 thereof, being more specifically distributed over the periphery thereof, as can be seen from FIG. 8.

A raised portion on that wall of the housing member 104, indicated at 113, serves as a contact-preventing means, that is to say to prevent the winding drum 2 from adhering to the braking magnet or magnets 101 in the axial direction of the winding drum.

Figure 6A:
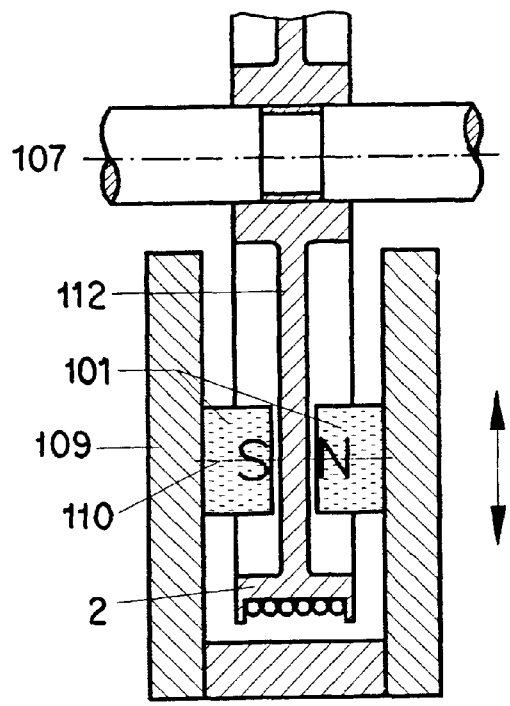

Referring now to the detail view in FIG. 6a, particularly when the winding drum has a drum disk 112 which is disposed at a central location in the axial direction of the winding drum the braking magnet or magnets 101 can be directed from both sides in alignment in the axial direction towards the disk 112. The first and second magnets 101 which are directed with different poles towards the disk 112 can be fixed on the insides of a generally U-shaped magnet holder indicated at 109 which embraces the radially outer end of the winding drum 2 and which in such an arrangement is displaceable in particular also in a radial direction, for varying the braking force applied to the winding drum.

Figure 6B:
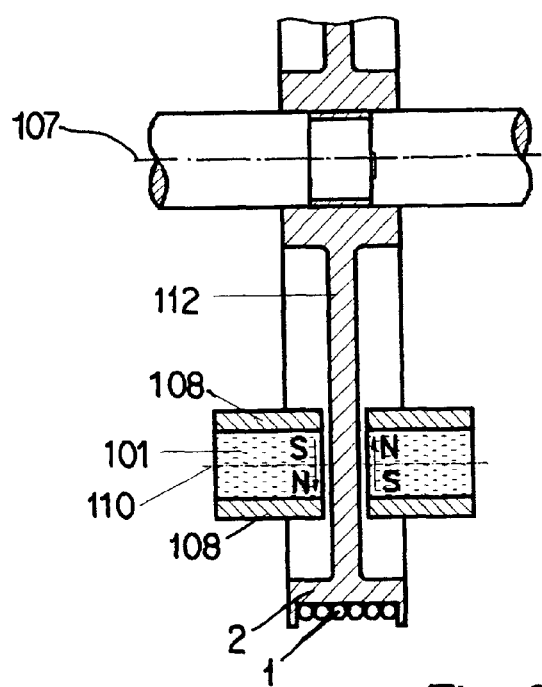

The detail view in FIG. 6b also shows retardation or braking magnets 101 which are directed from both axial directions towards the disk 112 but which, in contrast to the magnets 101 in FIG. 6a, have a magnetisation axis as indicated at 110 which is parallel to the drum disk 112, more specifically in the radial direction thereof, and which are each surrounded on the outside by pole pieces 108 of a generally plate-like configuration.

In contrast to the above-described embodiment shown in FIG. 6, in the structure shown in FIG. 7 the one or more retardation or braking magnets 101 are arranged in the drum disk 112 directly radially within the winding cylinder 105 of the winding drum 2, and face outwardly towards a wall of the housing profile 26, which is at a small spacing in opposite relationship to the magnets 101. In this case also, a raised portion corresponding to the raised portion 113 in FIG. 6 forms a contact-preventing means, but in this case the raised portion is provided on the winding drum 2.

Figure 9A:
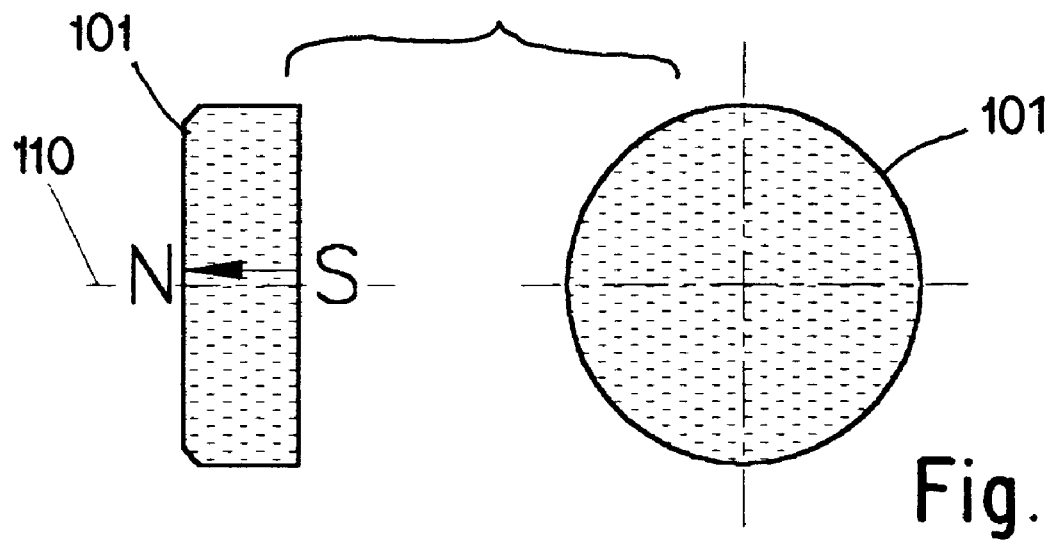
FIG. 9 shows detail views of the braking magnets.
Figure 9B:
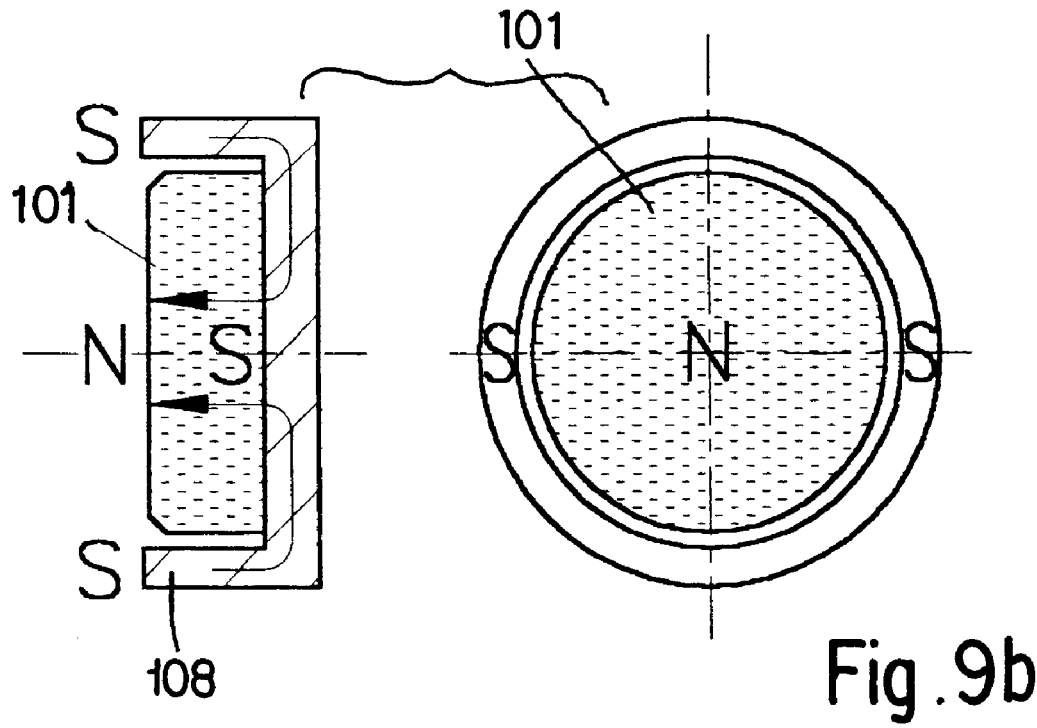

Both cases involve using magnets in the form of retardation or braking magnets 101 which are shown as a front view and a side view in FIG. 9 in two different versions. It will be apparent in this respect that in both cases the actual braking magnet 101 is magnetised in the through direction, through the thickness of the disk, so that the one face represents the North pole and the other represents the South pole. In the embodiment shown in the lower part of FIG. 9, the South pole and the periphery of the disk-shaped magnet are covered by a cup-shaped, one-piece pole shoe or pole piece 108 of soft iron, whereby in functional terms the South pole of that magnet is displaced insofar as the field lines are guided outside the South pole through the pole piece 108 to the open front side of the cup-shaped pole piece 108.

Reference will now be made to FIGS. 10a through 10h showing different forms of magnetisation of magnets in disk shape. In this respect, FIG. 10a corresponds to the structure shown in FIG. 9, wherein the entire face of the disk corresponds to a pole, that is to say a North pole or a South pole. The axial direction of the disk is thus the magnetisation axis. In contrast thereto in FIG. 10a' the magnetisation axis is parallel to the plane of the disk.

Figure 10A:
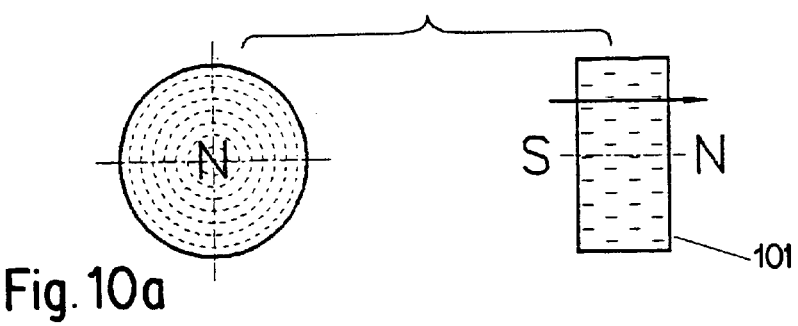
FIGS. 10a through 10h show differently magnetised magnets.
Figure 10A:
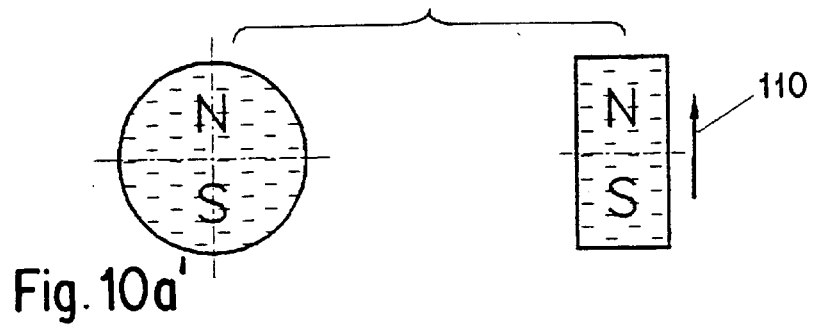
Figure 10B:
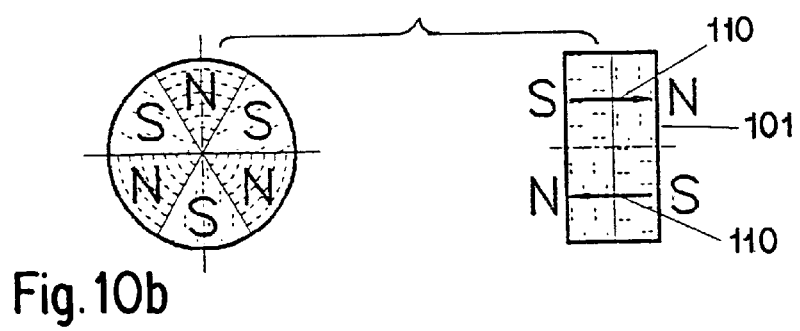

In a structure as shown in FIG. 10b, the magnetisation axis 110 is admittedly also parallel to the thickness dimension of the disk, but the disk periphery is subdivided into a plurality of sectors, in this case six, and each sector is magnetised separately in a direction through the disk, but with a polarity which alternates in the peripheral direction, so that on one face there are six different, mutually alternate poles, distributed over the periphery of the disk, and the same configuration on the opposite face, being magnetised axially through the disk in a sector configuration.

Figure 10C:
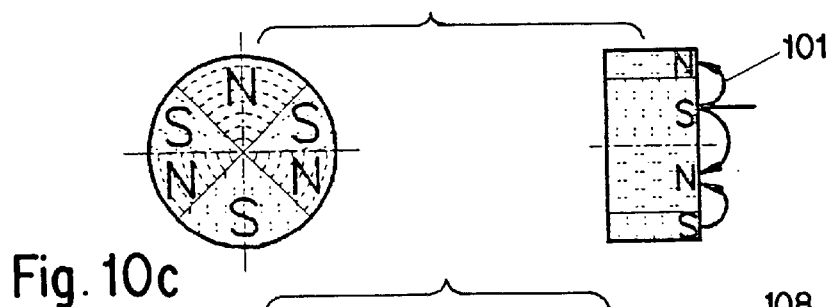

Looking at FIG. 10c, shown therein is a similar mode of magnetisation, which differs in a sector configuration, in the peripheral direction, but in this case the disk of the magnet is not magnetised there through in the axial direction thereof, but only one of the faces is overall magnetised so that this magnetised face can be considered as a succession, viewed in the peripheral direction, of bar magnets of different shapes, this therefore entailing lateral magnetisation, in a sector configuration, on one surface of the disk.

Figure 10D:
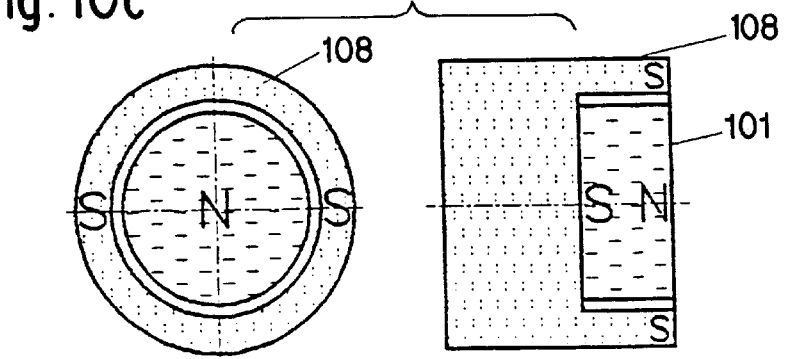
Figure 10E:
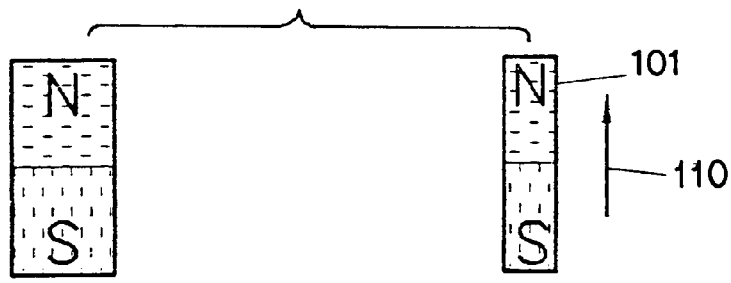

FIG. 10d shows the magnet of FIG. 10a but surrounded by a generally cup-shaped pole piece as is already shown in the lower part of FIG. 9 and as has been described hereinbefore.

FIGS. 10e through 10h in contrast show magnets in the form of bar magnets. In the structure shown in FIG. 10e, the longitudinal direction of the bar is the magnetisation direction, that is to say, with the North pole at a narrow end of the bar and the South pole at the opposite narrow end.

Figure 10F:
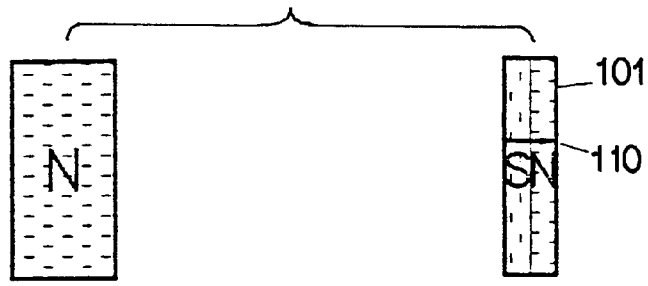

In FIG. 10f in contrast the magnetisation direction as indicated at 110 extends transversely with respect to the longitudinal extent of the bar magnet, in other words, with the North pole on the one wide side of the bar magnet and with the South pole on the other wide side.

Figure 10G:
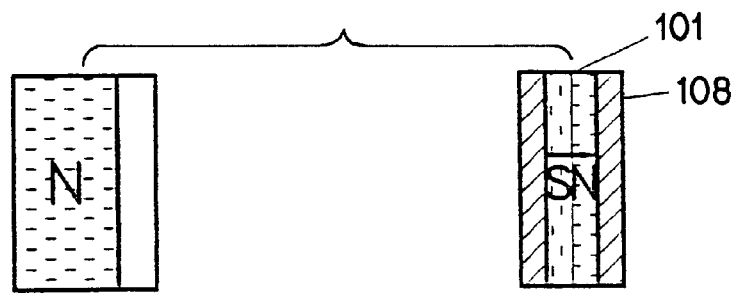

A similar consideration also applies to the magnet shown in FIG. 10g, which is additionally surrounded by a generally U-shaped pole piece 108, preferably of soft iron, whose limbs which terminate freely are disposed parallel to the South pole and North pole faces.

Figures 10H, 10I:
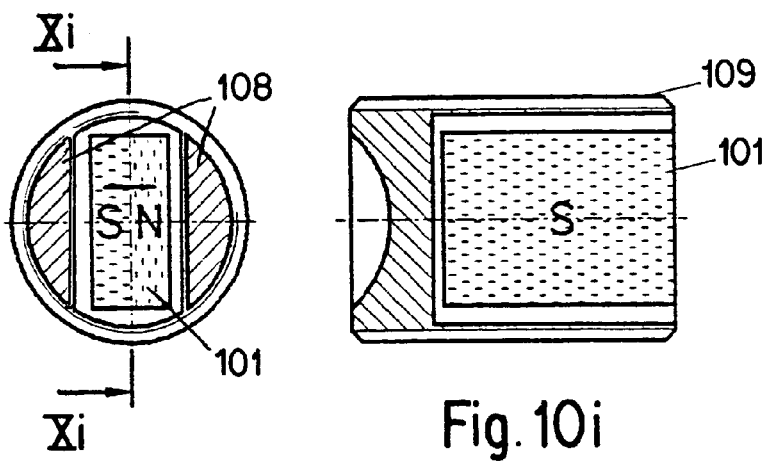

Such a structure is also shown in principle in FIG. 10h in which however, as viewed in plan view, the outside contours of the pole piece 108 are convexly curved so that the resulting configuration is a generally somewhat round external periphery.

In that way, the magnet 101 and the two pole pieces 108 can be jointly fitted into a cylindrical bore in the end of a magnet holder as indicated at 109 in the right-hand part of FIG. 10h, the holder 109 at its outer periphery which is also cylindrical having a male screwthread (shown but not referenced) for screwing into a fixing opening.

FIG. 11 again shows a sectional view of an embodiment of a travel sensor according to the invention, along the axis of rotation as indicated at 107.

In this embodiment also, the winding drum indicated at 2 is rotatably supported by means of its shaft and bearings 128 in side walls of a profile member 26 which serves as a housing.

In contrast to the structures shown in FIG. 6 or FIG. 7, the spoke disk 112 of the winding drum 2 is arranged centrally in the axial direction relative to the winding cylinder 105 whose outside surface which constitutes the winding surface 106 on to and from which the band as indicated at 1 is suitably wound. In the lower half of FIG. 11, arranged at the inside surface of the winding cylinder 105 in opposite relationship with respect to the spoke disk 112 are first and second holding magnets 102 in the form of bar magnets, which face with opposite poles towards each other, that is to say towards the drum disk 112. In this arrangement the holding magnets 102 preferably project somewhat in the longitudinal direction beyond the outside surfaces of the winding drum 2.

In order not to cause the winding drum 2 to suffer from an unbalance due to the presence of the holding magnets thereon, an identical pair of holding magnets 102 is also arranged on the radially inwardly disposed surface of the winding cylinder 105 on the side in opposite relationship with respect to the axis of rotation 107 of the winding drum 2. Fixing of the magnets is preferably effected by adhesive means.

It is also possible to envisage making an opening through the drum disk 112 in the longitudinal direction, for example by boring or drilling, and inserting there through a single bar magnet to act as a holding magnet 102, instead of the two mutually aligned bar magnets illustrated.

Figure 11:
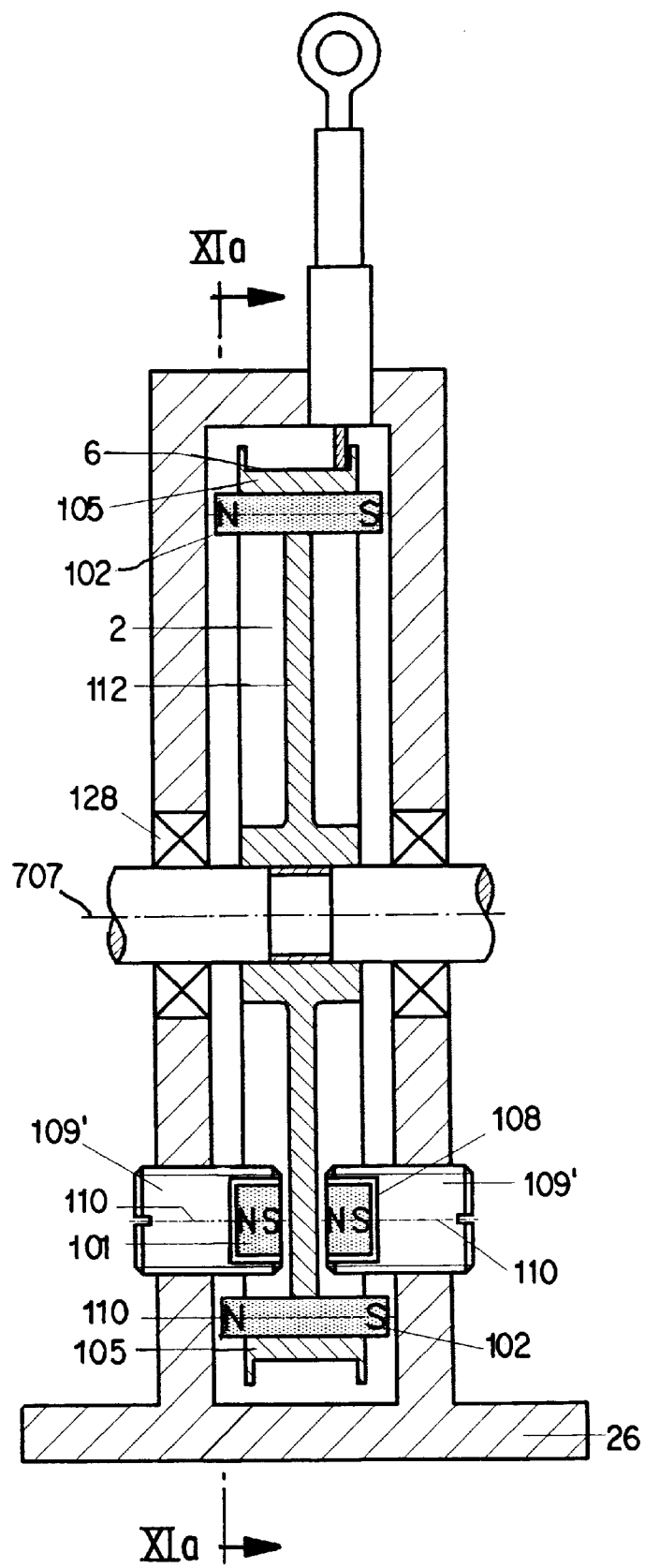
FIG. 11 shows a view in section through a further embodiment of a pull element travel sensor.

It will be appreciated however that in addition the lower half of FIG. 11 also shows a pair of retardation or braking magnets indicated diagrammatically at 101. They are arranged however at the side walls of the housing member 26 and extend, radially within the winding cylinder 105, to a position in close proximity to the disk 112 of the winding drum 2. For the purposes of adjustability of the air gap there between, the two magnets 101 which once again are arranged with their magnetisation direction parallel to the axis of rotation 107 and which are directed towards each other with opposite poles, are each arranged in respective recesses or depressions in the mutually facing ends of magnet holders 109 having a male screwthread, by means of which they can be screwed into a suitable, axially extending screwthreaded bore through the wall of the housing member 26, so that they are adjustable in regard to the magnitude of the air gap.

In this case, to increase the magnet force, the two magnets 101 are each disposed in a generally cup-shaped pole piece 108 whose open side is in this case also directed towards the drum disk 112 and thus towards the respective mutually oppositely directed magnet 101.

Figure 11A:
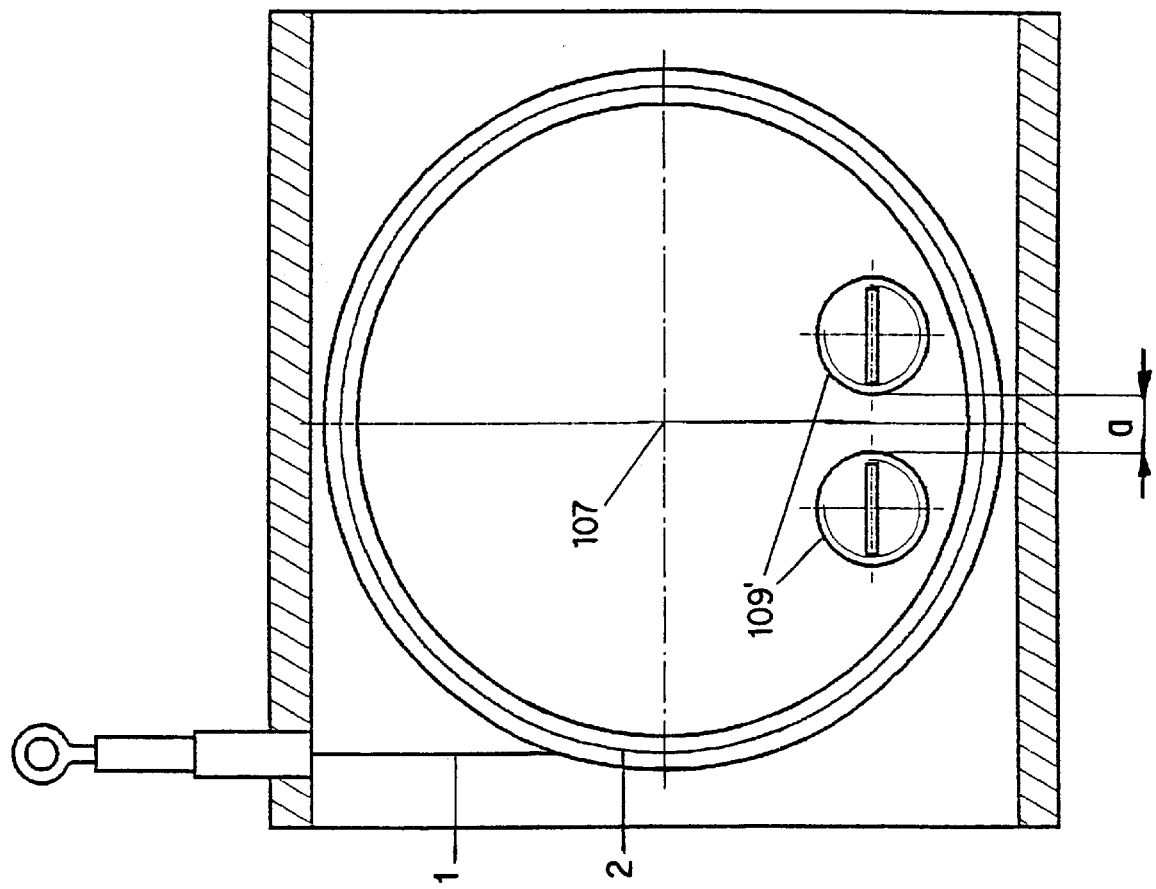

Reference will now be made to FIG. 11a illustrating a side view of the FIG. 11 structure and showing the possibility of arranging not just one but a plurality of such magnets 101, in a peripherally distributed array, in magnet holders 109 in the walls of the housing member 26. A minimum spacing indicated at a in FIG. 11a must be observed there between in order to prevent adverse mutual influencing of the magnets 110.

FIG. 11a further shows that it is not absolutely necessary to provide for uniform peripheral distribution of the magnets 101 or magnet holders 109.

It will be noted in this respect that for reasons of enhanced clarity of the drawing the holding magnets 102 are not illustrated here.

Figure 12:
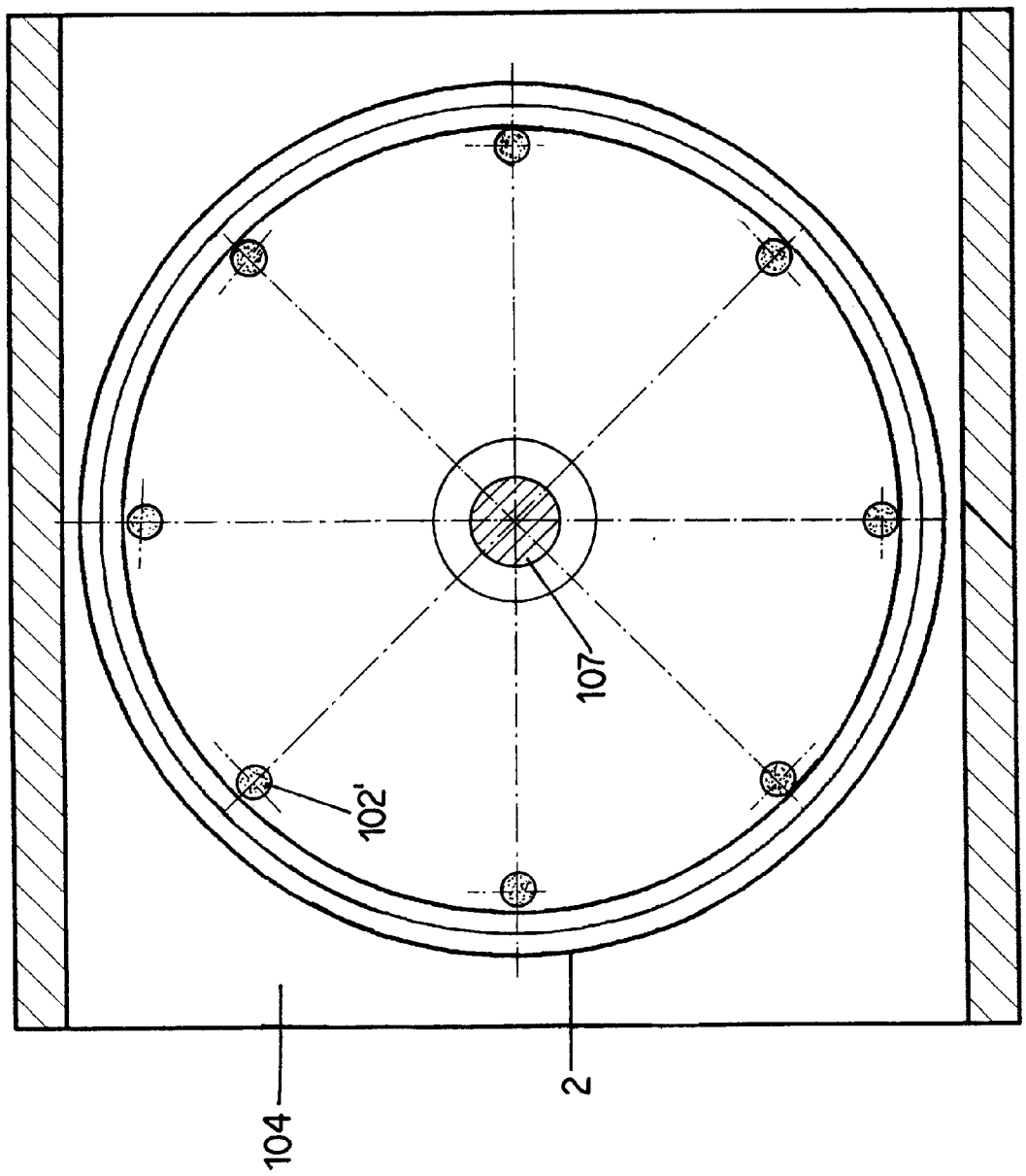
FIG. 12 shows a front view of the winding drum of the FIG. 11 structure.

Attention is now directed to FIG. 12 showing another front view of the winding drum 2 along line A—A in FIG. 11.

By virtue of suitable positioning of the section, FIG. 12 shows exclusively the holding magnets 102' on the winding drum 2, there being eight thereof arranged at respective spacings of 45°. This view is intended to make it clear that, in the event of selecting sufficiently strong holding magnets 102', those magnets can serve as combination magnets if the air gap thereof relative to the adjacent housing and in particular relative to the side wall of the housing member 26 is of the correct size. In that case, it is possible entirely to omit additional separate braking or retardation magnets as the holding magnets perform both a holding and a braking function.

Irrespective thereof all the illustrated structures only ever function properly on the basic assumption that in the case of the holding magnets the pull element or band 1 which is subjected to the action of the magnets must comprise a magnetisable material or, in the case of the braking or retardation magnets, the influenced component, that is to say when the braking magnets are arranged on the winding drum this being the housing or when the braking magnets are arranged on the housing this being the winding drum , at least in the influenced region thereof, must comprise electrically conductive material or must be electrically conductively coated.

When using combination magnets as indicated above, those conditions apply cumulatively.

Figure 13:
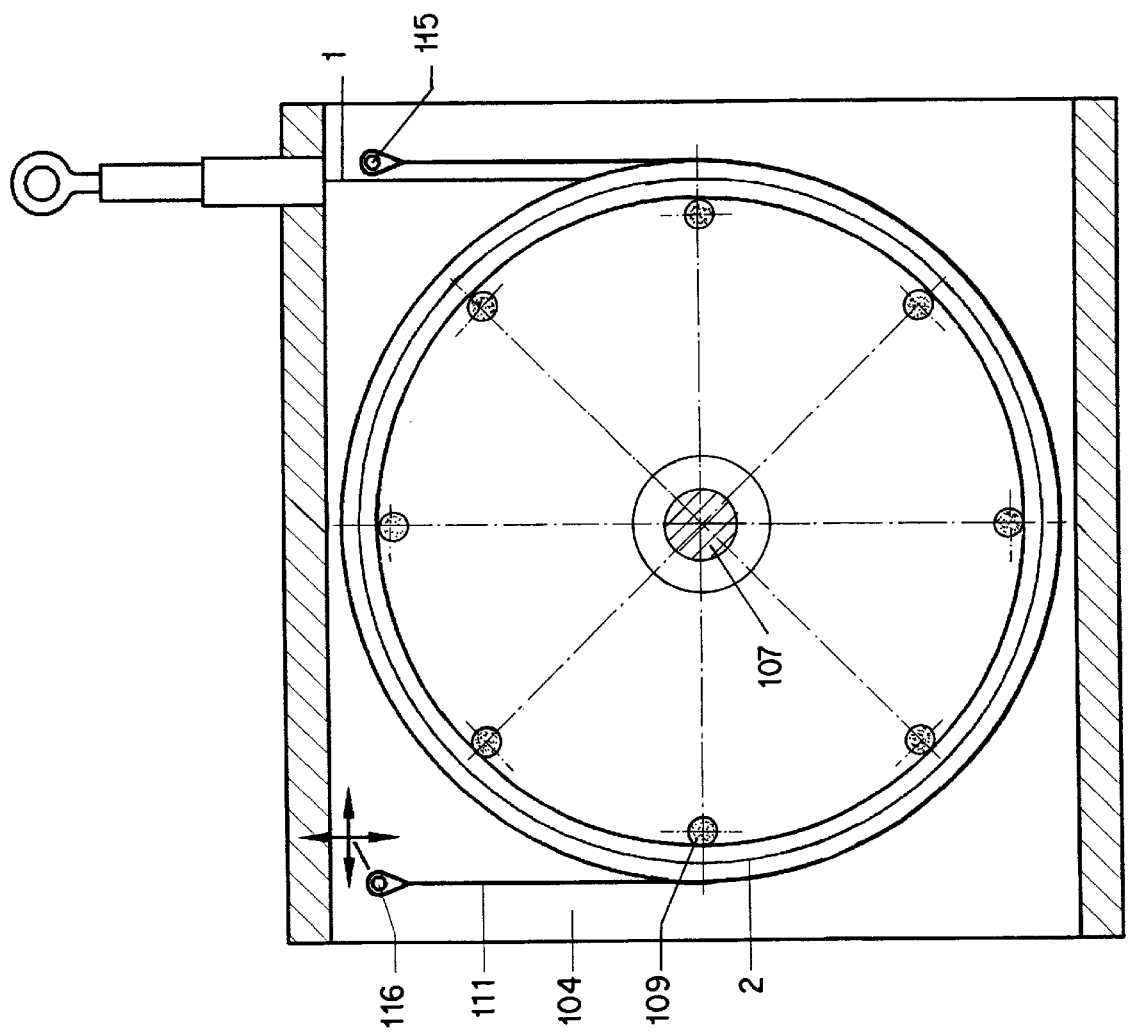
FIG. 13 shows a further embodiment of the pull element travel sensor.

Reference is now directed to FIG. 13 showing a structure which differs from FIG. 12 by virtue of the inclusion of a sliding or friction band or belt indicated diagrammatically at 111. This sliding belt of finite length generally comprises any suitable material such as a textile material or other slidable, non-abrasive material, for example felt or other material which has good oscillation-damping properties. The band or belt 111 is laid around a part of the winding drum 2, that is remote from the cable entrance, more particularly as illustrated extending over a region of about 180°. For that purpose, one end of the sliding belt or band 111 is secured to a fixed point indicated at 115 near to the cable entrance on the housing while the other end is fixed to the housing about an adjustment point 116 on the opposite side of the axis of rotation 107 of the winding drum 2. In that case, the displacement point 116 can be displaceable both tangentially and also radially with respect to the axis 107 of the winding drum 2, more particularly in first and second mutually perpendicular directions, in each case in transverse relationship with the axis of rotation 107.

In that case, the contact between the sliding belt 111 and the outwardly facing surface of the winding on the winding drum 2, such contact being loose or totally absent in the initial condition of the arrangement, can be adjusted in order to intensify or slacken such contact, for the purpose of preventing the band 1 from rising up or climbing up, that is to say lifting radially outwardly away from the peripheral or winding surface of the winding drum 2, in case the holding magnets 102 or the combination magnets 102' should not be sufficient to achieve that aim. That radial outward movement of the band 1 can already be impeded by virtue of the fact that there is essentially no contact between the sliding belt 111 and the outwardly facing surface of the winding on the winding drum 2, as such contact comes into existence only when the band 1 moves radially outwardly in the above-mentioned, undesired fashion. Consequently the spacing which is possibly present between the outside surface of the turns of band 1 on the drum and the inside surface of the band 111 is to be as small as possible, in an ideal case approximating to zero.

FIG. 13a in turn shows a structure in which the sliding band 111 is not laid loosely in the form of a belt around the drum with the band wound thereon, but is in the form of a lining carried on a slide or friction shoe 114. The contour configuration thereof, that is towards the winding drum 2, corresponds to the external contour of the drum 2. The shoe 114 extends through about 90° around the external peripheral surface of the winding drum 2, more specifically, in the winding-on direction, in the segment adjoining the point at which the band passes on to the winding drum 2. The shoe 114 is fixed to the housing 104, being in particular screwed thereto, and is so positioned that its lining consisting of the sliding band 111 has the desired contact with the external surface of the winding of the band 1 on the winding drum 2, as shown by the sectional view BB in FIG. 13a.

Referring now again to FIG. 2, shown therein in addition, in relation to the other views in FIGS. 1 and 3, is an arrangement which also already has braking or retardation magnets 101 in housing plate portions 15, the magnets being directed towards the end plate portions 14 of the winding drum.

Referring now to FIGS. 14a through 14c, shown therein is an alternative embodiment of the invention which also has braking or retardation magnets of the kind referred to above, as indicated at 101, which are also disposed in diametrally opposite relationship, at the same height on the housing. In this case however, in contrast to the structure shown in FIGS. 1 through 3, the housing comprises a portion of a box-shaped member 23 whose upper and lower open ends are closed by end plate portions indicated at 24, the lower one of which projects laterally beyond the housing member 26 and serves as a means for fixing the housing with respect to the ambient structure or the like.

Figure 15A:
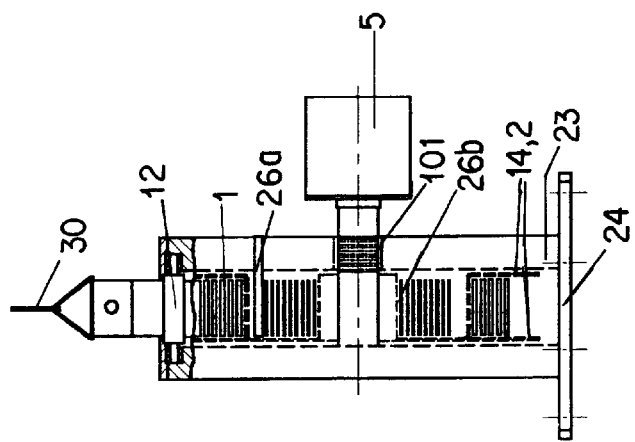
FIGS. 15a through 15c show views corresponding to FIGS. 14a through 14c of a further embodiment with braking magnets and a spring within the winding drum.
Figure 15B:
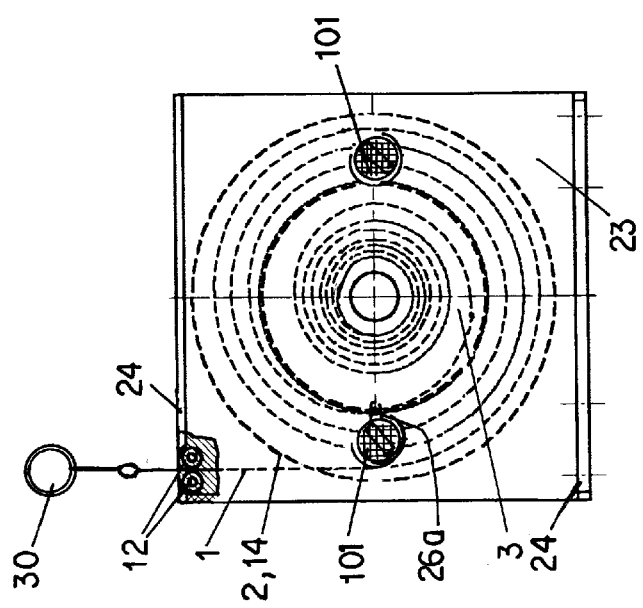
Figure 15C:
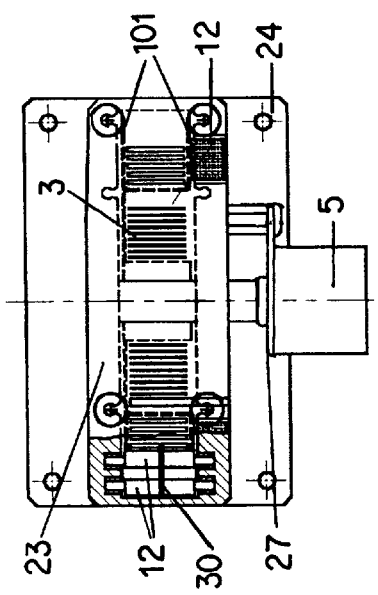

Looking now at FIGS. 15a through 15c, the structure therein differs from the structure shown in FIGS. 14a through 14c insofar as the flat spiral spring 3 is not arranged in axially displaced relationship with the winding drum 2 in a separate housing, but is arranged coaxially in the interior of the winding drum 2. For that purpose, disposed within the cylindrical winding surface of the winding drum 2 which is delimited at the ends by the end plate portions 14 is an opening which is open at least towards one end and in which the shaft of the rotary angle sensor 5 extends concentrically there through. Disposed in the annular space which is thereby formed there between is the flat spiral spring 3 which is connected by way of fixing points 26a, 26b on the one hand to a fixed point of the housing and on the other hand to the winding drum 2. That configuration saves on the entire axial space that would otherwise be required for a separate spring housing as indicated at 3' in FIGS. 14a and 14c.

Going on now to FIGS. 16a through 16c, the general configuration thereof is similar to that described above with reference to FIGS. 15a through 15c, but it differs therefrom in two regards, as set out below.

On the one hand, in the arrangement shown in FIGS. 16a through 16c the magnets are in the form of combination magnets as indicated at 102' and thus perform a dual function, on the one hand braking the winding drum 2 and on the other hand pulling the pulling element or band 1 radially inwardly on to the winding drum 2. For that purpose the combination magnets 102' are arranged distributed uniformly over the periphery of the winding drum 2 in the interior thereof, more specifically disposed within the cylindrical winding surface 105 thereof. The combination magnets 102' extend axially over the entire width of the winding drum 2 from one of the two end plate portions 14 to the other, with the magnetisation direction parallel to the axis of rotation of the winding drum 2.

The second difference lies in the fixing of the rotary angle sensor 5. It has an outwardly projecting hollow shaft which is fitted on to the shaft 4 of the winding drum 2 and non-rotatably connected thereto. In this arrangement, the torque support indicated at 27' between the non-rotating part of the rotary angle sensor 5 and the box member 23 serving as the housing comprises a sheet bending portion which is bendable in all directions transversely with respect to the axis of rotation as indicated at 11 and which thus serves at the same time to compensate for angular displacement between the rotary angle sensor 5 and the housing. The torque support 27' surrounds the shaft in an annular configuration and is secured at two mutually oppositely disposed sides to the housing, and at two other diagonally oppositely disposed sides to the rotary angle sensor 5, the fixing being effected for example by screw means.

Figure 17A:
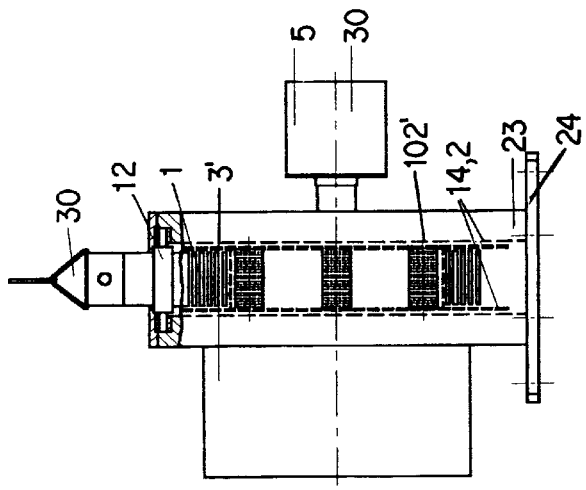
FIGS. 17a through 17c show views corresponding to FIGS. 14a through 14c of still another embodiment which in this case has combination magnets.
Figure 17B:
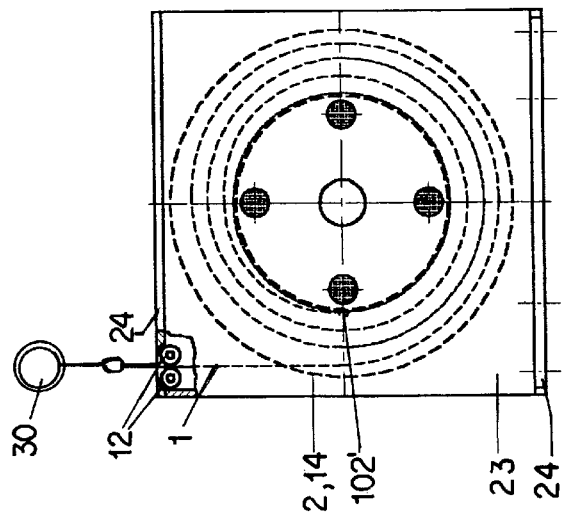
Figure 17C:
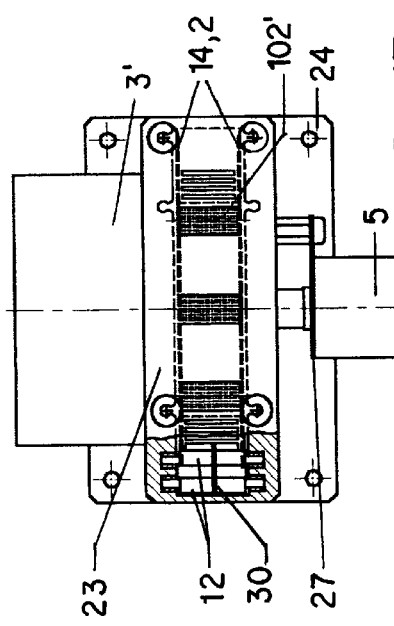

Referring now to FIGS. 17a through 17c, the structure shown therein generally corresponds to that described above with reference to FIGS. 16a through 16c, and more specifically in regard to the provision and the arrangement of the combination magnets 102', but it has the ordinary torque support 27 as shown in FIGS. 14a through 14c, more specifically the support which projects at one side from the shaft 4 and which is screwed to the housing.

FIGS. 18a through 18c show an arrangement which differs from that of FIGS. 14a through 14c insofar as the housing is in the form of a portion of a box member with two mutually juxtaposed chambers which are each closed in terms of their cross-section. The portion of the box member is arranged to extend in a horizontal direction, while the base plate thereof projects laterally outwardly and can be used for fixing purposes with respect to surrounding structure.

The end faces which are then open towards the side are closed off by suitable end plate portions as indicated at 24' in FIG. 18c. In that case, the rotary angle sensor 5 is carried on the one outside surface of the box member 23' while the spring housing 3' with the flat spiral spring 3 disposed therein is fixed on the other outside surface.

A winding drum 2 with combination magnets 102', as in the structures shown in FIGS. 16a through 16c and 17a through 17c, is arranged in the chamber adjacent to the spring housing 3', for winding on the pull element or band 1. In the chamber in the box member 23, which is disposed there beside, is a coupling which is identified by reference 25 in FIGS. 18a and 18c and which connects the shaft 4 on which the winding drum 2 and the torsion spring 3 are fixed to the shaft trunnion of the rotary angle sensor 5, non-rotatably with respect thereto and in such a way as to be capable of compensating for angular displacement.

The end plate portions 24, 24' are screwed to the box members 23, 23' of the housing in each case by way of screw passages which are provided in the box members 23' and which are open towards the internal chambers therein and which are of an undercut configuration. The screw means for screwing the end plate portions in position can be screwed self-tappingly into the screw passages from the ends thereof.

It will be appreciated that the above-described embodiments of the invention have been set forth solely by way of example and illustration of the principles of the invention and that various other modifications and alternations may be made therein without thereby departing from the spirit and scope of the invention.

What is claimed is:

1. A pull element travel sensor, comprising:
a winding drum,
a pull element adapted to be wound onto and unwound from the winding drum,
biassing means operatively connected to the winding drum for biassing the winding drum in winding-on direction, and
a detecting means for detecting the length of the pull element drawn off the winding drum,
wherein the pull element is windable on the winding drum in a spiral in a plurality of layers in mutually superposed relationship in a single radial plane of the winding drum.

2. A pull element travel sensor as set forth in claim 1, wherein the pull element is a band of a cross-section which in the axial direction of the axis of rotation of the winding drum is substantially greater than in a transverse direction thereto.

3. A pull element travel sensor as set forth in claim 2, wherein the cross-section of the band in said axial direction is at least ten times as great as in the transverse direction thereto.

4. A pull element travel sensor as set forth in claim 2, wherein the band exhibits at most slight stretchability in the longitudinal direction thereof.

5. A pull element travel sensor as set forth in claim 2, wherein said band is a metal band.

6. A pull element travel sensor as set forth in claim 1, wherein said biassing means comprises a flat spiral spring arranged in particular coaxially with respect to said winding drum.

7. A pull element travel sensor as set forth in claim 1, wherein said detecting means is a rotary angle sensor operatively connected to the winding drum and operable to detect angular distances covered by said winding drum,
and further including
an electronic evaluation means operable to ascertain the drawn-off length of said pull element from said angular travel of said winding drum having regard to the varying length of a winding of the pull element depending on the respective number of the layers of pull element wound on the winding drum.

8. A pull element travel sensor as set forth in claim 7, wherein said rotary angle sensor is non-rotatably connected to said winding drum.

9. A pull element travel sensor as set forth in claim 7, wherein said electronic evaluation means is operable to take account of said variable winding length in a self-learning procedure.

10. A pull element travel sensor as set forth in claim 9, wherein said electronic evaluation means is operable to take account of said variable winding length by a self-learning procedure in which a defined length of the pull element is drawn off the winding drum at least once and optionally even completely.

11. A pull element travel sensor as set forth in claim 1, wherein said detecting means is a sensing means disposed on the housing of the winding drum and the pull element has equal-length portions alternating in the longitudinal direction with changing properties which are electrically detectable.

12. A pull element travel sensor as set forth in claim 11, wherein said pull element is differently magnetisable in a portion-wise manner.

13. A pull element travel sensor as set forth in claim 1, wherein said detecting means comprises a means for emitting waves such as mechanical and in particular mechanical-elastic waves or sound waves along the unwound portion of said pull element and a time measuring means for determining the time between emission of the waves and receipt of the waves in their return from the free end of the pull element.

14. Apparatus as set forth in claim 1 and further including an adaptor engaged by free ends of respective pull elements, operable at the same time as a biassing means for biassing the winding drum in the winding-on direction.

15. A lifting apparatus for lifting a load comprising at least first and second lifting units and at least one travel sensor, wherein each lifting unit includes
a winding drum,
a pull element adapted to be wound onto and unwound from the winding drum,
a biassing means operatively connected to the winding drum for biassing the winding drum in the winding-on direction, and
a motor for driving the winding drum at least in the winding-on direction,
wherein the lifting units are arranged with free ends of the pull elements extending downwardly, and
wherein at least one of the lifting units has a detecting means for detecting the length of the pull element drawn off the winding drum and all pull elements are adapted to engage the same load.

16. Apparatus as set forth in claim 15, wherein each of said lifting units has a respective detecting means.

17. Apparatus as set forth in claim 16, wherein the pull element is adapted to be wound on the winding drum in a spiral configuration in a plurality of layers in mutually superposed relationship in a single radial plane of the winding drum.

18. Apparatus as set forth in claim 15, wherein the pull element is a band whose cross-section in the axial direction of the axis of rotation of the winding drum is substantially greater than in the transverse direction thereto.

19. Apparatus as set forth in claim 18, wherein said cross-section of said band in the axial direction is at least ten times as great as in the transverse direction thereto.

20. Apparatus as set forth in claim 15, wherein first and second bands are adapted to engage a load at a spacing relative to each other and with the main directions in which their cross-sections extend in mutually parallel relationship.

21. Apparatus as set forth in claim 15, wherein first, second, third and fourth bands are adapted to engage a load, the main direction in which the cross-sections of the bands extend being in quadrangular relationship with each other.

22. Apparatus as set forth in claim 15, wherein said motor serves at the same time as a biassing means for biassing the winding drum in the winding-on direction.

23. A pull element travel sensor, comprising:

a winding means comprising a winding retaining means for retaining a pull element in a spiral configuration and in a plurality of mutually superposed layers in a single radial plane of said winding means;

biasing means operatively connected to said winding means for said biasing the winding means in a winding-on direction on said pull element; and a detecting means for detecting a length of said pull element drawn from said winding means.

24. A pull element travel sensor, comprising:

a winding drum, a pull element adapted to be wound onto and unwound from the winding drum, a bias device operatively connected to the winding drum for biasing the winding drum in winding-on direction, and a sensing element for detecting the length of the pull element drawn off the winding drum, wherein the pull element is windable on the winding drum in a spiral in a plurality of layers in mutually superposed relationship in a single radial plane of the winding drum.

* * * * *